United States Patent
Fujita et al.

(10) Patent No.: US 8,017,276 B2
(45) Date of Patent: Sep. 13, 2011

(54) POWER OUTPUT DEVICE WITH FUEL CELL AND METHOD THEREFOR

(75) Inventors: Tatsuya Fujita, Susono (JP); Yasuhiko Niimi, Handa (JP); Takashi Kotoh, Nakano-ku (JP); Hideaki Mizuno, Owariasahi (JP); Nobuo Watanabe, Toyota (JP); Tadaichi Matsumoto, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 260 days.

(21) Appl. No.: 11/681,618

(22) Filed: Mar. 2, 2007

(65) Prior Publication Data
US 2007/0154756 A1    Jul. 5, 2007

Related U.S. Application Data

(62) Division of application No. 10/171,974, filed on Jun. 17, 2002.

(30) Foreign Application Priority Data

Jun. 15, 2001  (JP) .................................. 2001-181693
Feb. 1, 2002   (JP) .................................. 2002-025507

(51) Int. Cl.
   *H01M 8/04* (2006.01)
(52) U.S. Cl. ........ 429/432; 429/430; 429/442; 429/444; 429/9; 320/101
(58) Field of Classification Search .................. None
See application file for complete search history.

(56) References Cited

U.S. PATENT DOCUMENTS

| | | | | |
|---|---|---|---|---|
| 5,334,463 A | * | 8/1994 | Tajima et al. | 429/9 |
| 5,627,410 A | * | 5/1997 | Yu-Shu | 307/10.1 |
| 6,158,537 A | * | 12/2000 | Nonobe | 429/13 |
| 6,255,008 B1 | * | 7/2001 | Iwase | 429/9 |
| 6,329,089 B1 | * | 12/2001 | Roberts et al. | 429/13 |

(Continued)

FOREIGN PATENT DOCUMENTS

EP    0 633 157    1/1995

(Continued)

OTHER PUBLICATIONS

Definition of "user" retrieved from Dictionary.com on Jun. 10, 2010.*

(Continued)

*Primary Examiner* — Robert Hodge
(74) *Attorney, Agent, or Firm* — Oblon, Spivak, McClelland, Maier & Neustadt, L.L.P.

(57) ABSTRACT

An output limitation warning lamp is turned on when a possible output Qf of the fuel cell is less than a predetermined value L2. The output limitation warning lamp is provided at a combination meter in an instrument panel. The output limitation warning lamp is also turned on when a possible output Qb of the secondary battery is less than a predetermined value L3. Furthermore, the output limitation warning lamp is also turned on when an allowable drive output Qh, which is the sum of the possible output Qf of the fuel cell and the possible output Qb of the secondary battery, has been less than a required output Ed* calculated at a step before carrying out output limitation to more than a certain extent for longer than a predetermined length of time.

23 Claims, 19 Drawing Sheets

U.S. PATENT DOCUMENTS 6,672,415 B1    1/2004   Tabata ................ 180/65.2
2002/0038732 A1*  4/2002   Sugiura et al. ......... 180/65.2

FOREIGN PATENT DOCUMENTS

| | | |
|---|---|---|
| EP | 1 055 545 | 11/2000 |
| EP | 1 086 847 | 3/2001 |
| JP | 7-75214 | 3/1995 |
| JP | 10-74533 | 3/1998 |
| JP | 2000-357526 | 12/2000 |
| JP | 2001-28807 | 1/2001 |

OTHER PUBLICATIONS

Definition of "Possible" retrieved from Dictionary.com on Oct. 19, 2010.*

Definition of "User" retrieved from Dictionary.com on Jun. 10, 2010.*

Office Action issued Sep. 21, 2010, in Japan Patent Application No. 2006-318867 (with partial English translation).

* cited by examiner

POWER OUTPUT DEVICE WITH FUEL CELL AND METHOD THEREFOR

CROSS REFERENCE TO RELATED APPLICATION

This application is a division of and claims the benefit of priority from U.S. Ser. No. 10/171,974, filed Jun. 17, 2002, and is based upon and claims the benefit of priority from the prior Japanese Patent Application Nos. 2001-181693, filed on Jun. 15, 2001 and 2002-25507, filed on Feb. 1, 2002, the entire contents of which are incorporated herein by reference.

BACKGROUND OF THE INVENTION

1. Field of the Invention

This invention relates to a power output device with a fuel cell and a method of outputting power.

2. Description of Related Art

A device, which is mounted on a vehicle and limits an actual output of a fuel cell according to a required output calculated from a position of an accelerator pedal, has been suggested (for example, Japanese Patent Laid-Open Publication No. 7-75214). The device alters operating conditions of the fuel cell according to the required output, and performs a control to secure that the required output is outputted from the fuel cell. When the possible output of the fuel cell is less than the required output, the device limits the actual output to the possible output to prevent damage to the fuel cell.

However, with the above-mentioned art, a sense of discomfort may be given to an operator when the device is operated. When the required output from the operator is larger than the possible output of the fuel cell, the actual output is limited to the possible output of the fuel cell. Therefore, the operator has to conclude, from experience, that the required output is not available, whether by a failure in the power output device or the fuel cell not reaching normal operating conditions. If the operator uses the same power output device periodically, he or she can come to an appropriate conclusion. However, if the operator does not periodically use the power output device, it is difficult to come to an appropriate conclusion.

SUMMARY OF THE INVENTION

It is an object of the present invention to notify an operator of a state of power shortage, which is a shortage of a possible output from energy sources such as a fuel cell and a secondary battery.

The first aspect of the present invention is a power output device with a fuel cell as one of energy sources. The power output device includes a calculation device that calculates a parameter corresponding to a possible electric power from the fuel cell, a determining device that compares the calculated parameter with a predetermined value for determining a state of power shortage which is a shortage of the possible electric power, and a notification device that provides notification of the power shortage when the state of power shortage is determined through the determining device.

According to the power output device comprised above, the state of power shortage, which is a shortage of the possible electric power, is determined since the parameter corresponding to the possible electric power from the fuel cell is compared with the predetermined value by the determining device, and then the state of power shortage is notified by the notification device. Therefore, an operator can be notified that a possible output of the fuel cell is in short supply according to the power output device.

In the power output device, the calculation device may include a cell characteristic determining device that determines a characteristic of the fuel cell and a device that calculates the parameter as a maximum output under a rated voltage according to the detected cell characteristic.

According to the above-mentioned configuration, the parameter showing the maximum output of the fuel cell under the rated voltage can be calculated through the calculation device. Therefore, the state of power shortage which is a shortage of the possible electric power from the fuel cell can be detected from the parameter according to the power output device.

In the power output device according to the first aspect of the present invention, the calculation device may include a cell state determining device that determines a state of the fuel cell and a device that calculates the parameter as the amount of limiting output, which is for limiting an output of the fuel cell, according to the determined state of the fuel cell.

According to the above-mentioned configuration, the parameter showing the amount of limiting output for limiting the output of the fuel cell can be calculated through the calculation device. Therefore, the state of power shortage which is a shortage of the possible electric power from the fuel cell can be determined from the parameter.

The power output device with the amount of limiting output as the parameter may include a configuration in which the state of the fuel cell determined through the cell state determining device at least includes a temperature of the fuel cell.

According to the above-mentioned configuration, the amount of limiting output can be calculated according to the temperature of the fuel cell.

In the power output device according to the first aspect of the present invention, the calculation device may include a fuel pump state detecting device that detects a state of a fuel pump for supplying fuel gas to the fuel cell and a device that calculates the parameter as the amount of limiting fuel gas which is for limiting the amount of the fuel gas supplied from the fuel pump.

According to the above-mentioned configuration, the parameter showing the amount of limiting fuel gas which is for limiting the amount of the fuel gas supplied from the fuel pump can be calculated. Therefore, the state of power shortage which is a shortage of the possible electric power from the fuel cell can be determined from the parameter according to the power output device.

The power output device with the amount of limiting fuel gas as the parameter may include a configuration in which the state of the fuel pump detected through the fuel pump state detecting device is a temperature of a motor for the fuel pump.

According to the above-mentioned configuration, the amount of limiting fuel gas can be calculated according to the temperature of the motor for the fuel pump.

In the power output device according to the first aspect of the present invention, the calculation device may include a compressor state detecting device that detects a state of a compressor for supplying pressurized oxidizing gas to the fuel cell and a device that calculates the parameter as the amount of limiting the oxidizing gas which is for limiting the amount of oxidizing gas supplied from the compressor.

According to the above-mentioned configuration, the parameter showing the amount of limiting oxidizing gas which is for limiting the amount of the oxidizing gas supplied from the compressor can be calculated. Therefore, the state of power shortage which is a shortage of the possible electric power from the fuel cell can be detected from the parameter according to the power output device.

The power output device with the amount of limiting the oxidizing gas as the parameter may include a configuration in which the state of the compressor detected through the compressor state detecting device is a temperature of a motor for the compressor.

According to the above-mentioned configuration, the amount of limiting the oxidizing gas can be calculated according to the temperature of the motor for the compressor.

In the power output device according to the first aspect of the present invention, the notification device may include a notification lamp for visually carrying out the notification. According to the above-mentioned configuration, the operator can promptly learn the notification.

The second aspect of the present invention is a power output device with a fuel cell and a secondary battery, which can be charged with an output from the fuel cell, as energy sources. The power output device includes a calculation device that calculates a parameter corresponding to a possible electric power from the secondary battery, a determining device that compares the calculated parameter with a predetermined value for determining a state of power shortage which is a shortage of the possible electric power from the secondary battery, and a notification device that provides notification of the power shortage when the state of power shortage is determined through the determining device.

According to the power output device comprised above, the state of power shortage, which is a shortage of the possible electric power from the secondary battery, is determined since the parameter corresponding to the possible electric power from the secondary battery is compared with the predetermined value by the determining device, and then the state of power shortage is notified by the notification device. Therefore, an operator can be notified that a possible output of the secondary battery is in short supply according to the power output device.

In the power output device according to the second aspect of the present invention, the calculation device may include a cell state detecting device that detects a state of the secondary battery and a device that calculates the parameter as the amount of limiting output, which is for limiting an output of the secondary battery, according to the detected state of the secondary battery.

According to the above-mentioned configuration, the parameter showing the amount of limiting output for limiting the output of the secondary battery can be calculated through the calculation device. Therefore, the state of power shortage which is a shortage of the possible electric power from the secondary battery can be detected from the parameter.

The power output device with the amount of limiting output as the parameter may include a configuration in which the state of the secondary battery detected through the cell state detecting device at least includes a state of charge of the secondary battery and a temperature of the secondary battery.

According to the above-mentioned configuration, the amount of limiting the output can be calculated according to the state of charge of the secondary battery and the temperature of the secondary battery.

In the power output device according to the second aspect of the present invention, the notification device may include a notification lamp for visually carrying out the notification. According to the above-mentioned configuration, the operator can promptly learn the notification.

According to the third aspect of the present invention, a power output device includes a fuel cell, a secondary battery which can be charged with an output from the fuel cell, an inverter for driving a motor with a supplied output from the fuel cell and/or the secondary battery, a required output calculating device that calculates a required output of the motor, a calculation device that calculates a parameter corresponding to the sum of a possible electric power from the fuel cell and the secondary battery, a determining device that compares the calculated parameter with a predetermined value for determining a state of power shortage which is a shortage of the sum of the possible electric power from the fuel cell and the secondary battery, and a notification device that provides notification of the power shortage when the state of power shortage is determined through the determining device.

According to the power output device comprised above, the state of power shortage, which is a shortage of the sum of the possible electric power from the fuel cell and the secondary battery, is determined since the parameter corresponding to the sum of the possible electric power from the fuel cell and the secondary battery is compared with the predetermined value by the determining device, and then the state of power shortage is notified by the notification device. Therefore, an operator can be notified that the sum of the electric power from the fuel cell and the secondary battery is in short supply according to the power output device.

In the power output device according to the third aspect of the present invention, the notification device may include a notification lamp for visually carrying out the notification. According to the above-mentioned configuration, the operator can promptly learn the notification.

The fourth aspect of the present invention is a power output device with a fuel cell and a secondary battery which can be charged with an output from the fuel cell as energy sources. The power output device includes a first arithmetic device that calculates a first parameter corresponding to a possible electric power from the fuel cell, a first determining device that compares the calculated first parameter with a first predetermined value for determining a state of power shortage which is a shortage of the possible electric power from the fuel cell, a second arithmetic device that calculates a second parameter corresponding to a possible electric power from the secondary battery, a second determining device that compares the calculated second parameter with a second predetermined value for determining a state of power shortage which is a shortage of the possible electric power from the secondary battery, and a notification device that provides notification of the power shortage when the state of power shortage is determined through either the first or second determining device.

According to the power output device comprised above, the state of power shortage, which is a shortage of the possible electric power from the fuel cell, is determined since the first parameter corresponding to the possible electric power from the fuel cell is compared with the first predetermined value by the first determining device. In addition, the state of power shortage, which is a shortage of the possible electric power from the secondary battery, is determined since the second parameter corresponding to the possible electric power from the secondary battery is compared with the second predetermined value by the second determining device. Then the state of power shortage is notified by the notification device when the state of power shortage is determined through either the first or second determining device. Therefore, an operator can be notified that a possible output of the fuel cell or the secondary battery is in short supply according to the power output device.

The fifth aspect of the present invention is a power output device with a fuel cell as one of energy sources. The power output device includes a fuel cell maximum output calculating device that calculates a possible maximum output from the fuel cell when a load is not applied on the power output device, a device maximum output calculating device that uses the calculated maximum output of the fuel cell for calculating a possible maximum output from the power output device, a determining device that determines a state of power shortage in which the calculated maximum output of the power output device is less than a predetermined value, and a notification device that provides notification of the determined power shortage.

According to the power output device of the fifth aspect of the present invention above, the maximum output of the fuel cell is calculated when the load is not applied on the power output device. An open circuit voltage (OCV) of the fuel cell fluctuates depending on the load, and the OCV reaches the maximum when the load reaches the minimum, in other words, when the load is not applied. Therefore, the calculated maximum output of the fuel cell becomes a stable maximum value without an influence from the load as a factor of fluctuation. The possible maximum output from the power output device is calculated through the device maximum output calculating device with the use of the calculated maximum output of the fuel cell. Then the state of power shortage is determined through the determining device according to the calculated maximum output.

If a maximum output of a fuel cell is derived from a current output of the fuel cell which is being operated, a state of power shortage is frequently detected because of rapid fluctuation of the load, and then the power shortage is frequently notified. On the contrary, the state of power shortage is determined based on the stable maximum output according to the power output device of the fifth aspect of the present invention so that the state of power shortage is notified only if an output of the fuel cell is lowered by a failure. Therefore, an operator can accurately be notified of the failure of the fuel cell without an influence of the load fluctuation.

In the power output device according to the fifth aspect of the present invention, the notification device may include a notification lamp for visually carrying out the notification. According to the above-mentioned configuration, the operator can promptly learn the notification.

The sixth aspect of the present invention is a power output device with a fuel cell as one of energy sources. The power output device includes a fuel cell maximum output calculating device that calculates a possible maximum output from the fuel cell when a load is not applied on the power output device, a device maximum output calculating device that uses the calculated maximum output of the fuel cell for calculating a possible maximum output from the power output device, and an indication device that indicates the maximum output of the power output device calculated through the device maximum output calculating device when the load is applied on the power output device.

According to the power output device of the sixth aspect of the present invention above, the maximum output of the fuel cell is calculated when the load is not applied on the power output device. The calculated maximum output of the fuel cell, as described above, becomes a stable maximum value without an influence from the load as a factor of fluctuation. The possible maximum output from the power output device is calculated through the device maximum output calculating device with the use of the calculated maximum output of the fuel cell. Then the calculated maximum output is indicated by the indication device.

If a maximum output of a fuel cell is derived from a current output of the fuel cell which is being operated, the maximum output frequently fluctuates because of rapid fluctuation of the load. On the contrary, the stable maximum output is used according to the power output device of the fifth aspect of the present invention so that the maximum output of the power output device can be indicated without the influence of the load fluctuation. Therefore, an operator can accurately be notified of a failure of the fuel cell without the influence of the load fluctuation.

In the power output device according to the sixth aspect of the present invention, the indication device may include a meter for clearly indicating that the maximum output of the power output device is less than a predetermined value. According to the above-mentioned configuration, the operator can reliably learn a shortage of the maximum output through the meter.

According to the power output device with the above-described meter, the meter may include a pointer which is movable according to the maximum output of the power output device, a scale board for indicating a degree of swing of the pointer, and a caution zone provided on the scale board for indicating that the maximum output of the power output device is less than the predetermined value. According to the above-described configuration, the operator can learn the shortage of the maximum output by checking whether the pointer provided on the meter is pointing the caution zone or not.

According to the above-described power output device with the pointer and the caution zone both of which are provided on the scale board of the meter may include a notification lamp for providing notification of a power shortage when the pointer of the meter reaches the caution zone. According to the above-mentioned configuration, the operator can promptly learn the notification.

In the power output device according to the sixth aspect of the present invention, the power output device may include a current output calculating device that calculates a current output from the power output device and a current output indicating device that enables comparative indication of the current output and the indication through the indication device. According to the above-mentioned configuration, the maximum output and the current output of the power output device can be compared easily.

The seventh aspect of the present invention is a power output device with a fuel cell and a secondary battery which can be charged with an output from the fuel cell, for outputting power from both the cells. The power output device includes a fuel cell maximum output calculating device that calculates a possible maximum output from the fuel cell when a load is not applied on the power output device, a device maximum output calculating device that calculates the sum of the calculated maximum output of the fuel cell and a possible maximum output from the secondary battery as a possible maximum output from the power output device, a determining device that determines a state of power shortage in which the calculated maximum output of the power output device is less than a predetermined value, and a notification device that provides notification of the determined power shortage.

According to the power output device of the seventh aspect of the present invention above, the maximum output of the fuel cell is calculated when the load is not applied on the power output device. Therefore, the calculated maximum output of the fuel cell, as described above, becomes a stable maximum value without an influence from the load as a factor of fluctuation. The sum of the calculated maximum output of the fuel cell and the possible maximum output from the secondary battery is calculated through the device maximum output calculating device. Then the state of power shortage is determined according to the calculated maximum output of the power output device.

If a maximum output of a fuel cell is derived from a current output of the fuel cell which is being operated, a state of power shortage is frequently detected because of rapid fluctuation of the load, and then the power shortage is frequently notified. Especially, if a state of charge of a secondary battery begins to be insufficient, a state of power shortage is detected more frequently so that the notification of the power shortage is repeated more frequently according to a power output device with a fuel cell and the secondary battery. On the contrary, the state of power shortage is detected based on the stable maximum output as described above according to the power output device of the seventh aspect of the present invention so that the state of power shortage is notified only if an output of the fuel cell is lowered by a failure. Therefore, an operator can accurately be notified of the failure of the fuel cell without an influence of the load fluctuation even with the power output device with the fuel cell and the secondary battery.

The eighth aspect of the present invention is a power output device with a fuel cell and a secondary battery, which can be charged with an output from the fuel cell, for outputting power from both the cells. The power output device includes a fuel cell maximum output calculating device that calculates a possible maximum output from the fuel cell when a load is not applied on the power output device, a device maximum output calculating device that calculates the sum of the calculated maximum output of the fuel cell and a possible maximum output from the secondary battery as a possible maximum output from the power output device, and an indication device that indicates the maximum output calculated through the device maximum output calculating device when the load is applied on the power output device.

According to the power output device of the eighth aspect of the present invention above, the maximum output of the fuel cell is calculated when the load is not applied on the power output device. Therefore, the calculated maximum output of the fuel cell, as described above, becomes a stable maximum value without an influence from the load as a factor of fluctuation. The sum of the calculated maximum output of the fuel cell and the possible maximum output from the secondary battery is calculated through the device maximum output calculating device. Then the calculated maximum output of the power output device is indicated by the indication device.

If a maximum output of a fuel cell is derived from a current output of the fuel cell which is being operated, the maximum output frequently fluctuates because of rapid fluctuation of the load. Especially, if a state of charge of a secondary battery begins to be insufficient, a maximum output of the secondary battery drops more and rapidly fluctuates according to a power output device with a fuel cell and the secondary battery. On the contrary, the stable maximum output is used according to the power output device of the eighth aspect of the present invention so that the possible maximum output from the power output device can be indicated without an influence of the load fluctuation. Therefore, an operator can accurately be notified of a failure of the fuel cell without the influence of the load fluctuation even with the power output device with the fuel cell and the secondary battery.

In the power output device according to the eighth aspect of the present invention, the indication device may include a meter for clearly indicating that the maximum output of the power output device is less than a predetermined value. According to the above-mentioned configuration, the operator can reliably learn a shortage of the maximum output through the meter.

According to the power output device with the above-described meter, the meter may include a pointer which is movable according to the maximum output of the power output device, a scale board for indicating a degree of swing of the pointer, and a caution zone provided on the scale board for indicating that the maximum output of the power output device is less than the predetermined value. According to the above-described configuration, the operator can learn the shortage of the maximum output by checking whether the pointer provided on the meter is pointing the caution zone or not.

The ninth aspect of the present invention is a power output device with a fuel cell as one of energy sources. The power output device includes a device maximum output calculating device that calculates a possible maximum output from the power output device, a current output calculating device that calculates a current output from the power output device, and an indication device that enables comparative indication of the maximum output calculated through the device maximum output calculating device and the current output calculated through the current output calculating device.

According to the power output device of the ninth aspect of the present invention above, the maximum output and the current output from the power output device are comparatively indicated. Therefore, the maximum output and the current output of the power output device can be compared easily so that an operator can be notified of a power shortage from the energy source.

In the power output device according to the ninth aspect of the present invention, the indication device may include a meter for clearly indicating that the maximum output is less than a predetermined value. According to the above-mentioned configuration, the operator can reliably learn a shortage of the maximum output through the meter.

According to the power output device with the above-described meter, the meter may include a pointer which is movable according to the maximum output, a scale board for indicating a degree of swing of the pointer, and a caution zone provided on the scale board for indicating that the maximum output is less than the predetermined value. According to the above-described configuration, the operator can learn the shortage of the maximum output by checking whether the pointer provided on the meter is pointing the caution zone or not.

According to the above-described power output device with the pointer and the caution zone may include a notification lamp for providing notification of a power shortage when the pointer of the meter reaches the caution zone. According to the above-mentioned configuration, the operator can promptly learn the notification.

The tenth aspect of the present invention is a method of outputting power with a fuel cell as one of energy sources. The method of outputting power includes the steps of (a) calculating a parameter corresponding to a possible electric power from the fuel cell, (b) detecting a state of power shortage, which is a shortage of the possible electric power, by comparing the calculated parameter with a predetermined value, and (c) providing notification of the detected state of power shortage.

The method of outputting power of the tenth aspect of the present invention has similar effects and actions to those of the power output device according to the first aspect of the present invention. Therefore, an operator can be notified that a possible output of the fuel cell is in short supply.

The eleventh aspect of the present invention is a method of outputting power with a fuel cell and a secondary battery, which can be charged with an output from the fuel cell, as energy sources. The method of outputting power includes the steps of (a) calculating a parameter corresponding to a possible electric power from the secondary battery, (b) detecting a state of power shortage, which is a shortage of the possible electric power from the secondary battery, by comparing the calculated parameter with a predetermined value, and (c) providing notification of the detected state of power shortage.

The method of outputting power of the eleventh aspect of the present invention has similar effects and actions to those of the power output device according to the second aspect of the present invention. Therefore, an operator can be notified that a possible output of the secondary battery is in short supply.

The twelfth aspect of the present invention is a method of outputting power for controlling a power output device with a fuel cell, a secondary battery which can be charged with an output from the fuel cell, and an inverter for driving a motor with a supplied output from the fuel cell and/or the secondary battery. The method of outputting power includes the steps of (a) calculating a required output of the motor, (b) calculating a parameter corresponding to the sum of a possible electric power from the fuel cell and the secondary battery, (c) detecting a state of power shortage, which is a shortage of the sum of the possible electric power from the fuel cell and the secondary battery, by comparing the calculated parameter with a predetermined value, and (d) providing notification of the detected state of power shortage.

The method of outputting power of the twelfth aspect of the present invention has similar effects and actions to those of the power output device according to the third aspect of the present invention. Therefore, an operator can be notified that the sum of the possible electric power from the fuel cell and the secondary battery is in short supply.

The thirteenth aspect of the present invention is a method of outputting power with a fuel cell and a secondary battery, which can be charged with an output from the fuel cell, as energy sources. The method of outputting power includes the steps of (a) calculating a first parameter corresponding to a possible electric power from the fuel cell, (b) detecting a state of power shortage, which is a shortage of the possible electric power from the fuel cell, by comparing the calculated first parameter with a first predetermined value, (c) calculating a second parameter corresponding to a possible electric power from the secondary battery, (d) detecting a state of power shortage, which is a shortage of the possible electric power from the secondary battery, by comparing the calculated second parameter with a second predetermined value, (e) providing notification of the state of power shortage when the state of power shortage is detected through either step (b) or (d).

The method of outputting power of the thirteenth aspect of the present invention has similar effects and actions to those of the power output device according to the fourth aspect of the present invention. Therefore, an operator can be notified that a possible output from the fuel cell or the secondary battery is in short supply.

The fourteenth aspect of the present invention is a method of outputting power with a fuel cell as one of energy sources. The method of outputting power includes the steps of (a) calculating a possible maximum output from the fuel cell when a load is not applied on the power output device, (b) calculating a possible maximum output from the power output device by using the calculated maximum output of the fuel cell, (c) detecting a state of power shortage in which the calculated maximum output of the power output device is less than a predetermined value, and (d) providing notification of the detected state of power shortage.

The method of outputting power of the fourteenth aspect of the present invention has similar effects and actions to those of the power output device according to the fifth aspect of the present invention. Therefore, an operator can be notified of a failure of the fuel cell without an influence of the load fluctuation.

The fifteenth aspect of the present invention is a method of outputting power with a fuel cell as one of energy sources. The method of outputting power includes the steps of (a) calculating a possible maximum output from the fuel cell when a load is not applied on the power output device, (b) calculating a possible maximum output from the power output device by using the calculated maximum output of the fuel cell, and (c) indicating the maximum output of the power output device calculated through step (b) when the load is applied on the power output device.

The method of outputting power of the fifteenth aspect of the present invention has similar effects and actions to those of the power output device according to the sixth aspect of the present invention. Therefore, an operator can be notified of a failure of the fuel cell without an influence of the load fluctuation.

The sixteenth aspect of the present invention is a method of outputting power with a fuel cell and a secondary battery, which can be charged with an output from the fuel cell, to output power from both the cells. The method of outputting power includes the steps of (a) calculating a possible maximum output from the fuel cell when a load is not applied on the power output device, (b) calculating the sum of the calculated maximum output of the fuel cell and a possible maximum output from the secondary battery as a maximum output of the power output device, (c) detecting a state of power shortage in which the maximum output calculated through step (b) is less than a predetermined value, and (d) providing notification of the detected state of power shortage.

The method of outputting power of the sixteenth aspect of the present invention has similar effects and actions to those of the power output device according to the seventh aspect of the present invention. Therefore, an operator can be notified of a failure of the fuel cell without an influence of the load fluctuation even with the power output device with the fuel cell and the secondary battery.

The seventeenth aspect of the present invention is a method of outputting power with a fuel cell and a secondary battery, which can be charged with an output from the fuel cell, to output power from both the cells. The method of outputting power includes the steps of (a) calculating a possible maximum output from the fuel cell when a load is not applied on the power output device, (b) calculating the sum of the calculated maximum output of the fuel cell and a possible maximum output from the secondary battery as a maximum output of the power output device, and (c) indicating the maximum output calculated through step (b) when the load is applied on the power output device.

The method of outputting power of the seventeenth aspect of the present invention has similar effects and actions to those of the power output device according to the eighth aspect of the present invention. Therefore, an operator can be notified of a failure of the fuel cell without an influence of the load fluctuation even with the power output device with the fuel cell and the secondary battery.

The eighteenth aspect of the present invention is a method of outputting power with a fuel cell as one of energy sources. The method of outputting power includes the steps of (a) calculating a possible maximum output from a power output device, (b) calculating a current output of the power output device, and (c) indicating both the maximum output calculated through step (a) and the current output calculated through step (b) for comparison.

The method of outputting power of the eighteenth aspect of the present invention has similar effects and actions to those of the power output device according to the ninth aspect of the present invention. Therefore, an operator can be notified of a shortage of power from the energy source.

The present invention includes the following other aspects. According to the first another aspect of the present invention, the predetermined values compared with the parameters when each power output device or each method of outputting power of the present invention is employed are constant values set in advance. According to the second another aspect of the present invention, the predetermined values compared with the parameters when each power output device or each method of outputting power of the present invention is employed are variables fluctuating according to other physical values (for example, a physical value showing a state of the fuel cell or a physical value showing a state of the secondary battery). According to the third another aspect of the present invention, each power output device or each method of outputting power of the present invention is mounted on a vehicle or adopted, and the driver of the vehicle is notified through the notification device or step.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

The following explains each preferred embodiment of the present invention according to a preferred embodiment applied to a vehicle and the following items.
The First Preferred Embodiment
A. Device Configuration:
B. Electric Power Control Processes:
C. Control Processes of the Output Limitation Warning Lamp:
D. Effects:
The Second Preferred Embodiment
E. Device Configuration:
F. Meter Control Processes:
G. Effects:

The First Preferred Embodiment

A. Device Configuration

Figure 1:
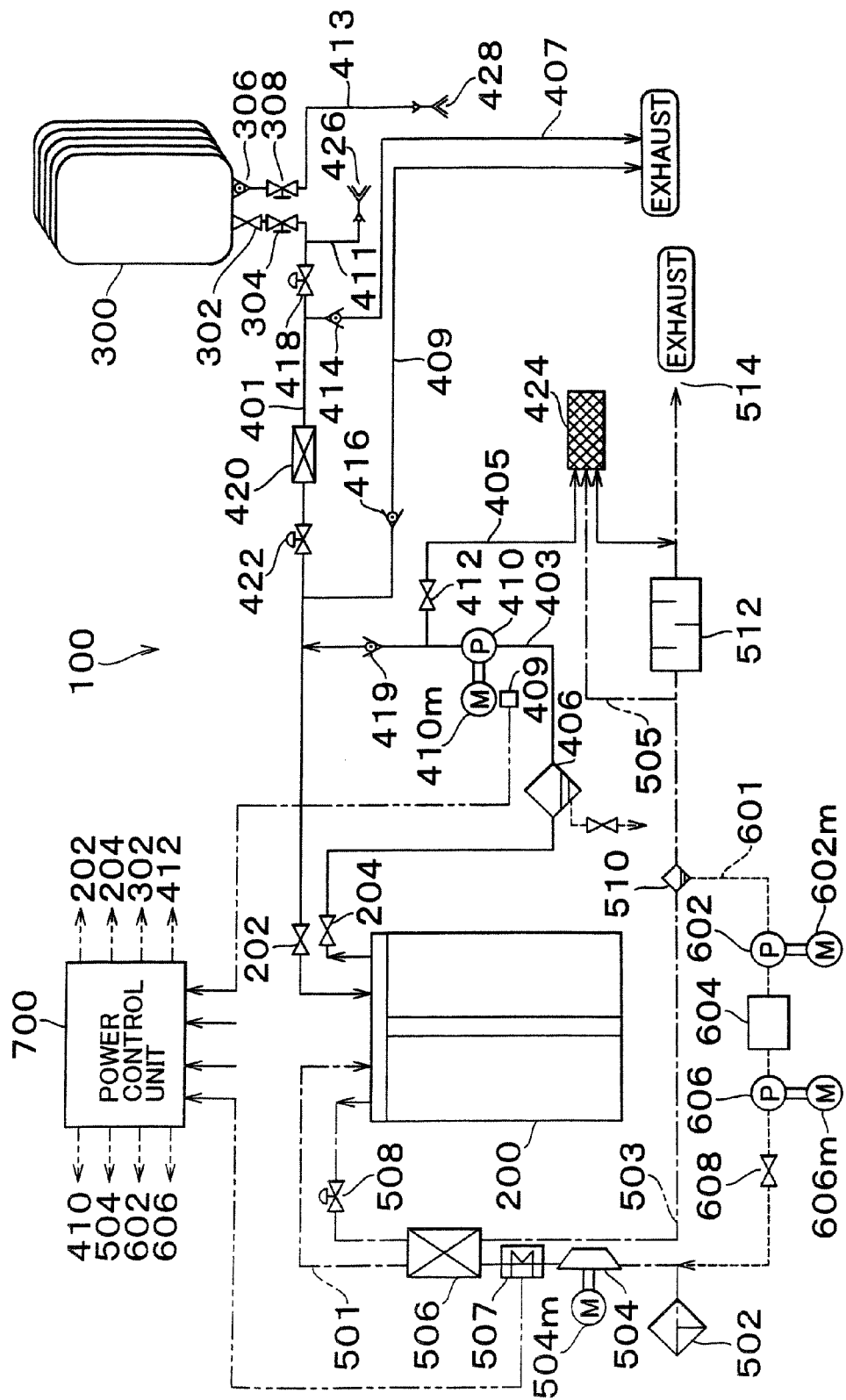
FIG. 1 is a block diagram mainly showing a gas system of a power output device for mounting on a vehicle as one preferred embodiment of the present invention.

FIG. 1 is a block diagram mainly showing a gas system of a power output device for mounting on a vehicle as the first preferred embodiment of the present invention. A power output device for mounting on a vehicle 100 such as a car, according to the present preferred embodiment, mainly includes a fuel cell 200 supplied with hydrogen gas to generate electric power, a high-pressure hydrogen gas tank 300 for supplying hydrogen gas to the fuel cell 200, and a drive motor (described later) which outputs power through electric power generated by the fuel cell 200.

The fuel cell 200 is also supplied with oxidizing gas containing oxygen such as air along with hydrogen gas containing hydrogen, and causes electric-chemical reactions according to the reaction formulas shown below at a hydrogen electrode and an oxygen electrode to generate electric power.

In other words, when hydrogen gas is supplied to the hydrogen electrode, and oxygen gas is supplied to the oxygen electrode, the reaction (1) is caused on the side of the hydrogen electrode, and the reaction (2) is caused on the side of the oxygen electrode. In the entire fuel cell, the reaction (3) is caused.

$$H_2 \rightarrow 2H^+ + 2e^- \quad (1)$$

$$2H^+ + 2e^- + (\tfrac{1}{2})O_2 \rightarrow H_2O \quad (2)$$

$$H_2 + (\tfrac{1}{2})O_2 \rightarrow H_2O \quad (3)$$

The fuel cell 200 is a fuel cell stack with plural single cells stacked up. A single cell includes an electrolytic membrane (not shown), the hydrogen electrode and the oxygen electrode which are diffusion electrodes (not shown), and two separators (not shown). In this case, the electrolytic membrane is located between the diffusion electrodes and the diffusion electrodes are located between the separators. Irregularities are formed on both sides of the separators, and the irregularities form in-single cell gas channels between the hydrogen electrode and the oxygen electrode. Hydrogen gas supplied in the above-described way flows in the in-single cell gas channels formed between one separator and the hydrogen electrode. Oxidizing gas flows in the in-single cell gas channels formed between the other separator and the oxygen electrode. The fuel cell stack is stored in a stack case, and is installed in a vehicle.

On the other hand, high-pressure hydrogen gas is stored in the high-pressure hydrogen tank 300 which discharges the high-pressure hydrogen gas at pressures ranging approximately from 20 to 35 Mpa by opening a shut valve 302 attached at the base of the tank. According to the present preferred embodiment, four of the high-pressure hydrogen gas tanks 300 are mounted in the vehicle.

In addition, the power output device for mounting on a vehicle 100 of the present preferred embodiment includes a hydrogen gas channel for circulating hydrogen gas in the system, an oxidizing gas channel for circulating oxidizing gas in the system, a water circulation channel 601 for circulating water contained in oxygen off-gas, and a power control unit 700 for controlling the entire device.

The hydrogen gas channel includes a main channel 401 originating from a discharge port of the high-pressure hydrogen gas tank 300 and ending at a supply inlet of the fuel cell 200, a circulation channel 403 originating from a discharge port of the fuel cell 200 and ending at a point midway of the main channel 401 through a pump 410, a discharging channel 405 for discharging impurities in circulating hydrogen gas, relief channels 407 and 409 for discharging the hydrogen gas under abnormal pressures, a leak check channel 411 for checking leakage of the hydrogen gas, and a supply channel 413 originating from a hydrogen gas supply port 428 and ending at a charge inlet of the high-pressure hydrogen gas tank 300. The present preferred embodiment uses the high-pressure hydrogen gas tank 300 as a supply source of hydrogen gas to discharge high-pressure hydrogen gas.

The shut valve 302 and a discharge manual valve 304 are arranged at the discharge port of the high-pressure hydrogen gas tank 300 on the main channel 401. A depressurizing valve 418, a heat exchanger 420, and a depressurizing valve 422 are arranged at points midway of the main channel 401, and a shut valve 202 is arranged at the supply inlet of the fuel cell 200. A shut valve 204 is arranged at the discharge port of the fuel cell 200 on the circulation channel 403, and a gas-liquid separator 406, pump 410, and a reverse flow preventing valve 419 are arranged at points midway of the circulation channel 403. A reverse flow preventing valve 306 and a charge manual valve 308 are arranged at the charge inlet of the high-pressure hydrogen gas tank 300. A shut valve 412 and a hydrogen dilutor 424 are arranged on the discharging channel 405. Furthermore, a relief valve 414, a relief valve 416, and a leak check port 426 are arranged on the relief channel 407, the relief channel 409, and the leak check channel 411 respectively.

On the other hand, the oxidizing gas channel includes an oxidizing gas supplying channel 501 for supplying oxidizing gas to the fuel cell 200, an oxygen off-gas discharging channel 503 for discharging oxygen off-gas discharged from the fuel cell 200, and an oxygen off-gas introducing channel 505 for introducing oxygen off-gas to the hydrogen dilutor 424.

An air cleaner 502, a compressor 504, and a moisturizing module 506 are arranged on the oxidizing gas supplying channel 501. A pressure adjusting valve 508, the moisturizing module 506, a gas-liquid separator 510, a silencer 512 and an off-gas discharging port 514 are arranged on the oxygen off-gas discharging channel 503.

Pumps 602 and 606, a moisturizing water tank 604, and an injector 608 are arranged on the water circulation 601. The pumps 410, 602 and 606, and the compressor 504 are driven by motors 410$m$, 602$m$, 606$m$ and 504$m$, respectively.

The power control unit 700 is comprised in the device as a microcomputer internally including a CPU, a RAM and a ROM. The power control unit 700 inputs detected results from various sensors (not shown), and controls the valves (202, 204, 302 and 412) and the motors (410$m$, 602$m$, 606$m$ and 504$m$) for the pumps (410, 602 and 606) and the compressor 504, respectively. Control lines have been omitted to make the drawing easily viewable. The discharge manual valve 304 and the charge manual valve 308 are opened and closed manually.

First, the following explains the flow of the oxidizing gas. When the compressor 504 is driven by the power control unit 700, air in the atmosphere as oxidizing gas is taken in, and is cleaned by the air cleaner 502. Next the air is pressurized by the compressor 504. Then the pressurized air flows through the oxidizing gas supplying channel 501, and is supplied to the fuel cell 200 through the moisturizing module 506.

The supplied oxidizing gas is discharged as oxygen off-gas after being used for the above-described electric-chemical reaction in the fuel cell 200. Then the discharged oxygen off-gas flows through the oxygen off-gas discharging channel 503, and flows back to the moisturizing module 506 after flowing through the pressure adjusting valve 508.

As described above, water ($H_2O$) is formed according to the formula (2) on the side of the oxygen electrode of the fuel cell 200. Therefore, the oxygen off-gas discharged from the fuel 200 contains a lot of moisture. On the other hand, the oxidizing gas (air) taken in from the atmosphere, and pressurized by the compressor 504, is low-humidity gas.

According to the present preferred embodiment, the oxidizing gas supplying channel 501 and the oxygen off-gas discharging channel 503 pass through the same moisturizing module. Then steam is exchanged between the oxidizing gas supplying channel 501 and the oxygen off-gas discharging channel 503 to moisturize the dry oxidizing gas from the very wet oxygen off-gas. As a result, the oxidizing gas, which flows out of the moisturizing module 506, and is supplied to the fuel cell 200, becomes wet to a certain extent. On the other hand, the oxygen off-gas, which flows out of the moisturizing module 506, and is discharged into the atmosphere outside the vehicle, becomes dry to a certain extent.

Then the oxygen off-gas, which becomes dry to a certain extent at the moisturizing module 506 as describes above, flows into the gas-liquid separator 510. The oxygen off-gas from the moisturizing module 506 is separated into gas and liquid by the gas-liquid separator 510. Liquid moisture contained in the oxygen off-gas is further removed to dry the oxygen off-gas. The removed moisture is recovered as recovered water, and is drawn by the pump 602 to be stored in the moisturizing water tank 604. Then the recovered water is drawn out to the injector 608 by the pump 606, and is atomized by the injector 608 at an inlet of the compressor 504. Then the atomized water is mixed with the oxidizing gas from the air cleaner 502. Therefore, the oxidizing gas flowing through the oxidizing gas supplying channel 501 is wetted further.

The oxygen off-gas, which becomes drier at the gas-liquid separator 510 as described above, is silenced by the silencer 512. Then the oxygen off-gas is discharged into the atmosphere outside the vehicle from the off-gas discharging port 514.

A temperature sensor 507 is provided next to the compressor 504 on a channel connecting the compressor 504 and the moisturizing module 506. Temperatures at the motor 504m for the compressor 504 and an inverter (not shown) connected to the motor 504m rise since they generate heat internally due to loss. If their temperatures rise excessively, it may accelerate degradation of insulators, and have an adverse effect on bearings and commutators. To prevent the above-mentioned problem, the temperature sensor 507 detects a temperature around the motor. When the temperature rises excessively, a control by the power control unit 700 to restrain the rotational speed of the motor 504m for the compressor 504 is performed.

The following explains the flow of hydrogen gas. Under normal conditions, the discharge manual valve 304 is constantly open, and the charge manual valve 308 is constantly closed. By the power control unit 700, the shut valve 302 of the high-pressure hydrogen tank 300 and the shut valves 202 and 204 of the fuel cell 200 are open when the fuel cell system is driven, and they are kept closed when the fuel cell system is turned off. The shut valve 412 of the discharging channel 405 is normally kept closed by the power control unit 700 when the fuel system is driven. The relief valves 414 and 416 are normally kept closed unless under abnormal pressures.

When the device is driven and the power control unit 700 opens the shut valve 302 as described above, hydrogen gas is discharged from the high-pressure hydrogen tank 300. The discharged hydrogen gas is supplied to the fuel cell 200 after flowing through the main channel 401. The supplied hydrogen gas is used for the above-described electric-chemical reactions in the fuel cell 200 and discharged as hydrogen off-gas. The discharged hydrogen off-gas flows back to the main channel 401 after flowing through the circulation channel 403. Then the hydrogen off-gas is supplied back to the fuel cell 200. At this time, the hydrogen off-gas flowing through the circulation channel 403 is given momentum and drawn into the main channel 401 by driving the pump 410 provided at a point midway of the circulation channel 403. As described above, the hydrogen gas circulates in the main channel 401 and the circulation channel 403. On the circulation channel 403, the reverse flow preventing valve 419 is provided between a point where the circulation channel 403 is connected to the main channel 401 and the pump 410 to prevent the circulating hydrogen off-gas from flowing reversely.

By reintroducing the hydrogen off-gas into the main channel 401 as described above, apparent flow rate and flow velocity of the hydrogen gas supplied to the fuel cell 200 increase, even though the amount of hydrogen used in the fuel cell 200 is the same. Therefore, favorable conditions are provided from the point of view of supplying hydrogen to the fuel cell 200. As a result of this, output voltage of the fuel cell 200 increases.

Furthermore, impurities such as nitrogen in the air, which leaks from the side of the oxygen electrode to the side of the hydrogen electrode after permeating through the electrolytic membrane, do not collect around the hydrogen electrode by circulating hydrogen gas. Therefore, the output voltage of the fuel cell 200 does not drop due to impurities such as nitrogen.

Even if hydrogen gas is introduced uniformly in the fuel cell system, impurities constantly leak from the side of the oxygen electrode to the side of the hydrogen electrode in the fuel cell 200. Therefore, the concentration of the impurities in the uniform hydrogen gas gradually increases and that of the hydrogen decreases accordingly. To obviate the above-described problem, the shut valve 412 is provided on the discharging channel 405 which branches from the circulation channel 403 and is kept open periodically by the power control unit 700 to discharge a part of the hydrogen gas containing the impurities. A part of the hydrogen gas including the impurities is discharged from the circulation channel by opening the shut valve 412 and pure hydrogen gas is introduced from the high-pressure hydrogen tank 300 accordingly. As a result of this, the concentration of the impurities in the hydrogen gas decreases and that of the hydrogen increases. Therefore, the fuel cell 200 can continuously and appropriately generate power. Though the time interval for opening the shut valve 412 differs depending on driving conditions and output, it may be once in five seconds, for example.

In this connection, the output voltage of the fuel cell 200 drops only for an instant and does not drop dramatically even if the shut valve 412 is opened when the fuel cell generates power. No longer than one second for opening the shut valve 412 is preferable. For example, around 500 msec is more preferable.

The hydrogen gas discharged from the shut valve 412 is supplied to the hydrogen dilutor 424 after flowing through the discharging channel 405. Oxygen off-gas is also supplied to the hydrogen dilutor 424 after flowing through the oxygen off-gas introducing channel 505 which branches from the oxygen off-gas discharging channel 503. The hydrogen dilutor dilutes the discharged hydrogen gas from the shut valve 412 by mixing the supplied hydrogen gas and the oxygen off-gas. The diluted hydrogen gas is introduced into the oxygen off-gas discharging channel 503 and is further mixed with the oxygen off-gas flowing in the oxygen off-gas discharging channel 503. Then the mixed gas is exhausted into the atmosphere outside the vehicle from the off-gas discharging port 514.

The rotation speed (revolving speed) of the motor 410m for the pump 410 is controlled by the power control unit 700, and the pump 410 changes the flow velocity of hydrogen off-gas flowing in the circulation channel 403. In other words, the amount of hydrogen gas supplied as fuel is controlled according to the amount of consumption of electric power generated from the fuel cell 200. Furthermore, a temperature sensor 409 is provided at the motor 410m. Temperatures at the motor 410m and an inverter (not shown) connected to the motor 410m rise since they generate heat internally due to loss. If their temperatures rise excessively, it may accelerate degradation of insulators and have an adverse effect on bearings and commutators. To prevent the above-mentioned problem, the temperature sensor 409 detects a temperature around the motor. When the temperature rises excessively, a control by the power control unit 700 to restrain the rotational speed (revolving speed) of the motor 410m within a predetermined value is performed.

The two depressurizing valves, the depressurizing valve 418 for the primary depressurization and the depressurizing valve 422 for the secondary depressurization, are provided around an outlet of the high-pressure hydrogen tank 300. These two valves depressurize the high-pressure hydrogen gas in the high-pressure hydrogen gas tank 300 in two steps. Specifically the depressurizing valve 418 for the primary depressurization depressurizes the high-pressure hydrogen gas from pressures approximately ranging from 20 to 35 Mpa to pressures approximately ranging from 0.8 to 1 Mpa. Then the depressurizing valve 422 for the secondary depressurization depressurizes the high-pressure hydrogen gas from pressures approximately ranging from 0.8 to 1 Mpa to pressures approximately ranging from 0.2 to 0.3 Mpa. As a result of this, the fuel cell 200 is not damaged since the high-pressure hydrogen gas is not supplied to the fuel cell 200.

When the depressurizing valve 418 for the primary depressurization depressurizes the high-pressure hydrogen gas from pressures approximately ranging from 20 to 35 Mpa to pressures approximately ranging from 0.8 to 1 Mpa, discharge temperature of hydrogen discharged from the high-pressure hydrogen gas tank 300 varies depending on pressure and flow rate since the discharge is accompanied by expansion. The present preferred embodiment adopts the configuration in which the heat exchanger 420 is provided between the depressurizing valve 418 for the primary depressurization and the depressurizing valve 422 for the secondary depressurization to exchange heat with the depressurized hydrogen gas. The heat exchanger 420 is supplied with water coolant (not shown) which has circulated in the fuel cell 200 and the supplied water coolant exchanges heat with the hydrogen gas whose temperature has varied. The hydrogen gas can be supplied to the fuel cell 200 since temperature of the hydrogen gas approximately changes to within an appropriate temperature range after the hydrogen gas flows through the heat exchanger 420. Therefore, electric-chemical reaction proceeds well since a sufficient reaction temperature can be provided so that the fuel cell 200 generates power appropriately.

As described, water ($H_2O$) is formed on the side of the oxygen electrode in the fuel cell 200 according to the formula (2). Then the water in the state of steam permeates into the side of the hydrogen electrode through the electrolytic membrane. Therefore, the hydrogen off-gas discharged from the fuel cell 200 is wet and contains a lot of moisture. According to the present preferred embodiment, the gas-liquid separator 406 is provided at a point midway of the circulation channel 403. Moisture contained in the hydrogen off-gas is separated into gas and liquid by the gas-liquid separator 406 and the liquid moisture is removed. Then only the separated gas (steam), along with other kinds of gas, is introduced into the pump 410. As a result of this, only the gaseous moisture is contained in the hydrogen gas so that the fuel cell continues generating power efficiently since moisture mixed with liquid and gas is not supplied to the fuel cell 200.

On the other hand, the pressure of the hydrogen gas supplied to the fuel cell 200 may abnormally increase and the fuel cell 200 may have a problem if the depressurizing valve 418 or the depressurizing valve 422 breaks down. To deal with the case above, the relief valve 414 is provided on the relief channel 407 which branches after the depressurizing valve 418 on the main channel 401, and the relief valve 416 is provided at a point midway of the relief channel 409 which branches after the depressurizing valve 422. As a result of this, the relief valve 414 opens when pressure of the hydrogen gas in the main channel 401 between the depressurizing valve 418 and the depressurizing valve 422 reaches equal to or greater than a predetermined value. The relief valve 416 opens when pressure of the hydrogen gas in the main channel 401 between the depressurizing valve 422 and the fuel cell 200 reaches equal to or greater than a predetermined value. Therefore, the above-described two relief valves exhaust the hydrogen gas into the atmosphere outside the vehicle to prevent the hydrogen gas from exceeding the predetermined value further.

When charging the high-pressure hydrogen tank 300 with hydrogen gas, a hydrogen gas supplying pipe (not shown) is connected to the hydrogen gas supplying port 428 and the charge manual valve 308 attached to the high-pressure hydrogen tank 300 is manually opened. As a result of this, the high-pressure hydrogen tank 300 is charged with the high-pressure hydrogen gas introduced from the hydrogen gas supplying pipe after the high-pressure hydrogen gas flows through the supplying channel 413. The reverse flow preventing valve 306 is provided at the base of the high-pressure hydrogen tank 300 to prevent the charged hydrogen gas in the high-pressure hydrogen tank 300 from reversely flowing.

Figure 2:
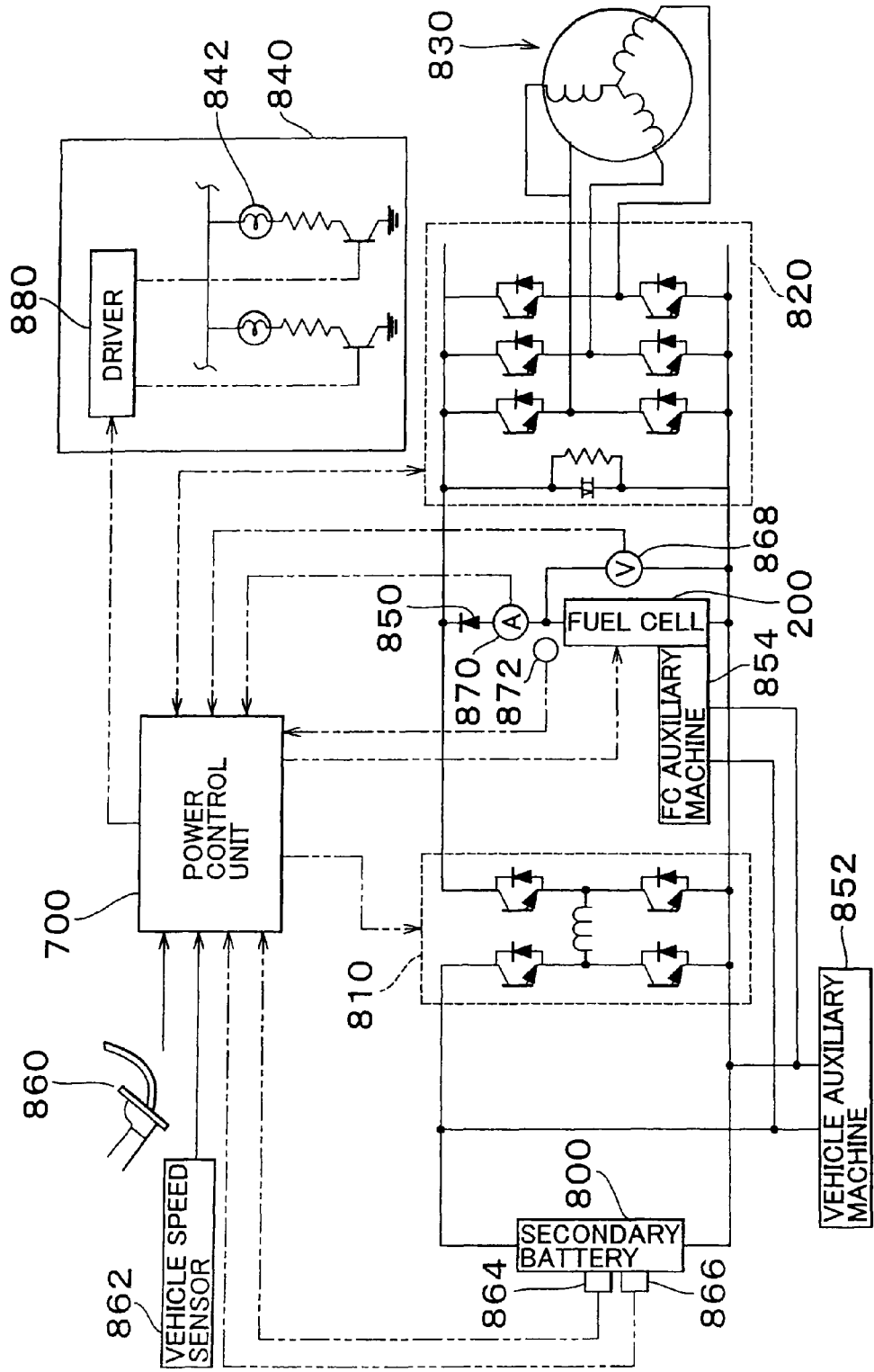
FIG. 2 is a block diagram mainly showing an electric system of a power output device for mounting on a vehicle according to this preferred embodiment.

FIG. 2 is a block diagram mainly showing an electric system of a power output device for mounting on a vehicle according to this preferred embodiment. As shown in FIG. 2, the power output device for mounting on a vehicle 100 mainly includes, as an electric system, the above-mentioned fuel cell 200, a secondary battery 800, a high-tension converter 810, an inverter 820, a drive motor 830, a combination meter 840, and the above-mentioned power control unit 700 for controlling the entire device.

The fuel cell 200 and the inverter 820 are connected to the secondary battery 800 in parallel through the high-tension converter 810. A diode 850 for preventing current from the secondary battery 800 from passing reversely is connected in series with the fuel cell 200. Electric power generated from the fuel cell 200 is supplied to the secondary battery 800 according to circumstances, as well as to the inverter 820. Electric power generated from the secondary battery 800 is supplied to the inverter 820 through the high-tension converter 810. The secondary battery is a storage cell capable of charging and discharging. Though a nickel-hydrogen battery is used according to the present preferred embodiment, various types of secondary batteries can be applied.

The high-tension converter 810 increases a voltage output from the secondary battery 800 and applies the increased voltage to the inverter 820 in parallel. At this time, the high-tension converter 810 increases the voltage according to control signals from the power control unit 700. In fact, the high-tension converter 810 includes four switching elements (for example, a bipolar MOSFET (IGBT)) and a reactor as main circuit elements and can increase applied DC voltage to desired DC voltage since the switching action of these switching elements is controlled by the control signals from the power control unit 700. In addition, the high-tension converter 810 can adjust the DC voltage input from the fuel cell 200 and output the adjusted voltage at the secondary battery 800. Therefore, the secondary battery can be charged and discharged by the functions of the high-tension converter 810.

The inverter 820 drives the drive motor 830 with electric power supplied from the fuel cell 200 or the secondary battery 800. Specifically, the inverter 820 converts the DC voltage applied from the fuel cell 200 or the secondary battery 800 into three phase AC voltage and supplies the drive motor 830 with the three phase AC voltage. At this time, the inverter 820 adjusts amplitude (pulse amplitude, in fact) and frequency of the three phase AC voltage which is to be supplied to the drive motor 830 according to the control signals from the power control unit 700 to control torque generated from the motor 830.

In fact, the inverter 820 includes six switching elements (for example, a bipolar MOSFET (IGBT)) as main circuit elements, and can convert applied DC voltage into three phase AC voltage with desired amplitude and frequency, since the switching action of these switching elements is controlled by the control signals from the power control unit 700.

The drive motor 830, for example, includes a three phase synchronous motor and is driven by an electric power supplied through the inverter 820 to generate torque at a vehicle axle (not shown).

A vehicle auxiliary machine 852 and a FC auxiliary machine 854 are connected to a point between the secondary battery 800 and the high-tension converter 810. In other words, the secondary battery 800 is an electric power source for these auxiliary machines. The vehicle auxiliary machine 852 refers to various electric equipment including lighting equipment, air-conditioning equipment and a hydraulic pump. The FC auxiliary machine 854 refers to various electric equipment used for operating the fuel cell 200, including the pump 410, the compressor 504, and the pumps 602 and 606.

Operation of the fuel cell 200, the high-tension converter 810 and the inverter 820 is controlled by the power control unit 700. The power control unit 700 controls switching of the inverter 820, and outputs three phase AC according to a required power at the drive motor 830. In addition, the power control unit 700 controls operation of the fuel cell 200 and the high-tension converter 810 to provide electric power according to a required power.

To carry out these controls, various sensor signals are input into the power control unit 700. Sensors such as an accelerator pedal sensor 860, a vehicle speed sensor 862 for detecting a vehicle speed, a SOC sensor 864 for detecting a state of charge of the secondary battery 800, a secondary battery temperature sensor 866 for detecting a temperature of the secondary battery 800, a voltage sensor 868 for detecting an output voltage of the fuel cell 200, an electric current sensor 870 for detecting an output current of the fuel cell 200, and a fuel cell temperature sensor 872 for detecting a temperature of the fuel cell 200 are connected to the power control unit 700. The other sensors connected to the power control unit 700 have been omitted in FIG. 2. The SOC sensor 864 includes an electric current sensor and a voltage sensor, both of which are connected to the secondary battery 800, and the power control unit 700 calculates a SOC according to an amperage of electric current detected by the electric current sensor and a voltage detected by the voltage sensor. Calculation of the SOC can be carried out in consideration of SOC history.

Figure 3:
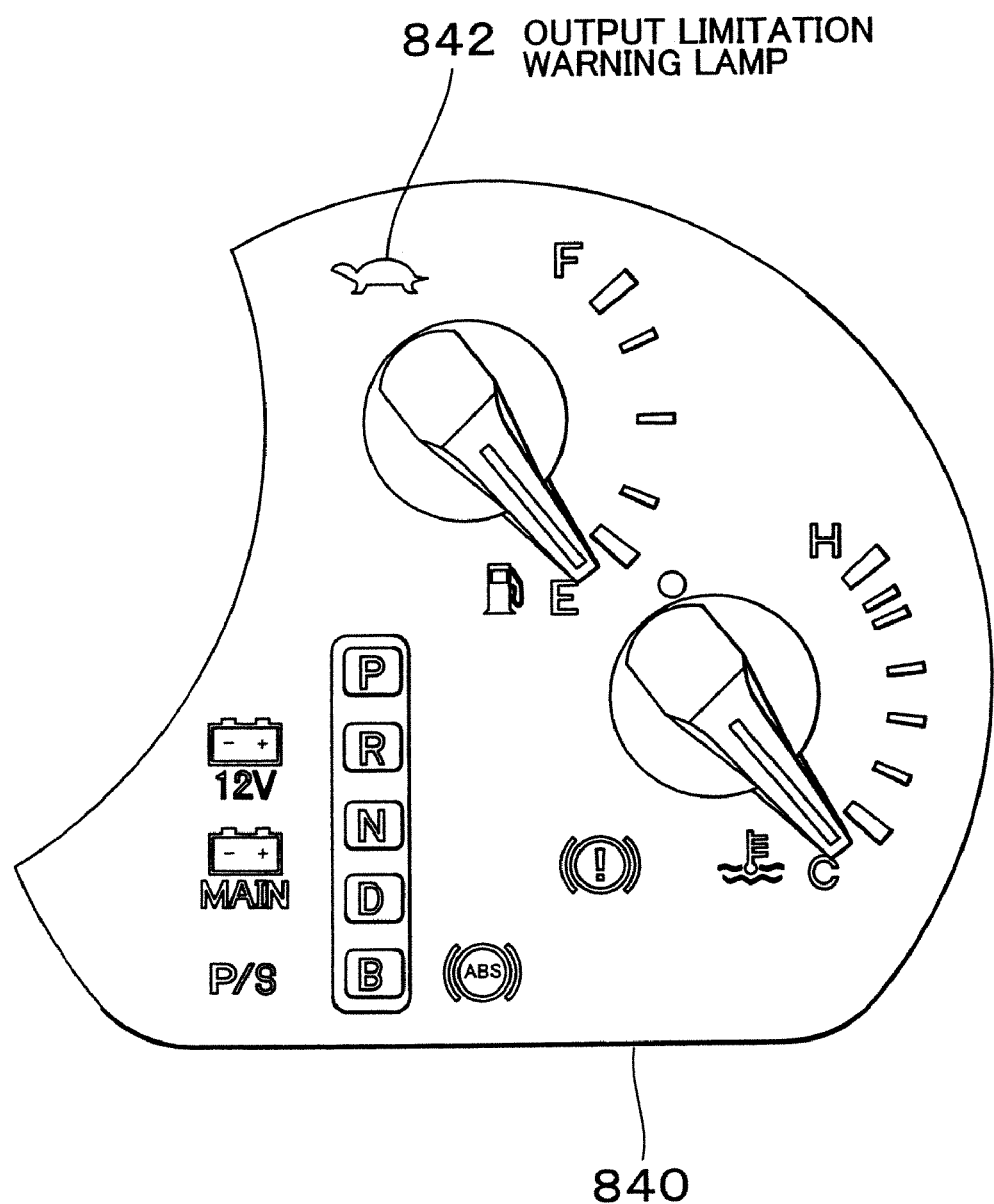
FIG. 3 is an explanatory drawing showing an example of a combination meter.

The combination meter 840 is provided at an instrument panel (not shown) in a compartment of the vehicle, and has good visibility for a driver. FIG. 3 is an explanatory drawing showing an example of the combination meter 840. Various meters and lamps such as a fuel gauge are provided at the combination meter 840 as shown. Element 842 is an output limitation warning lamp for warning a driver, by turning on the lamp, that the engine is running with its output limited because of the fuel cell 200 or the secondary battery operated in overload. Referring back to FIG. 2, driving of the output limitation warning lamp 842 of the combination meter 840 is controlled by the power control unit 700 though a driver 880.

Figure 4:
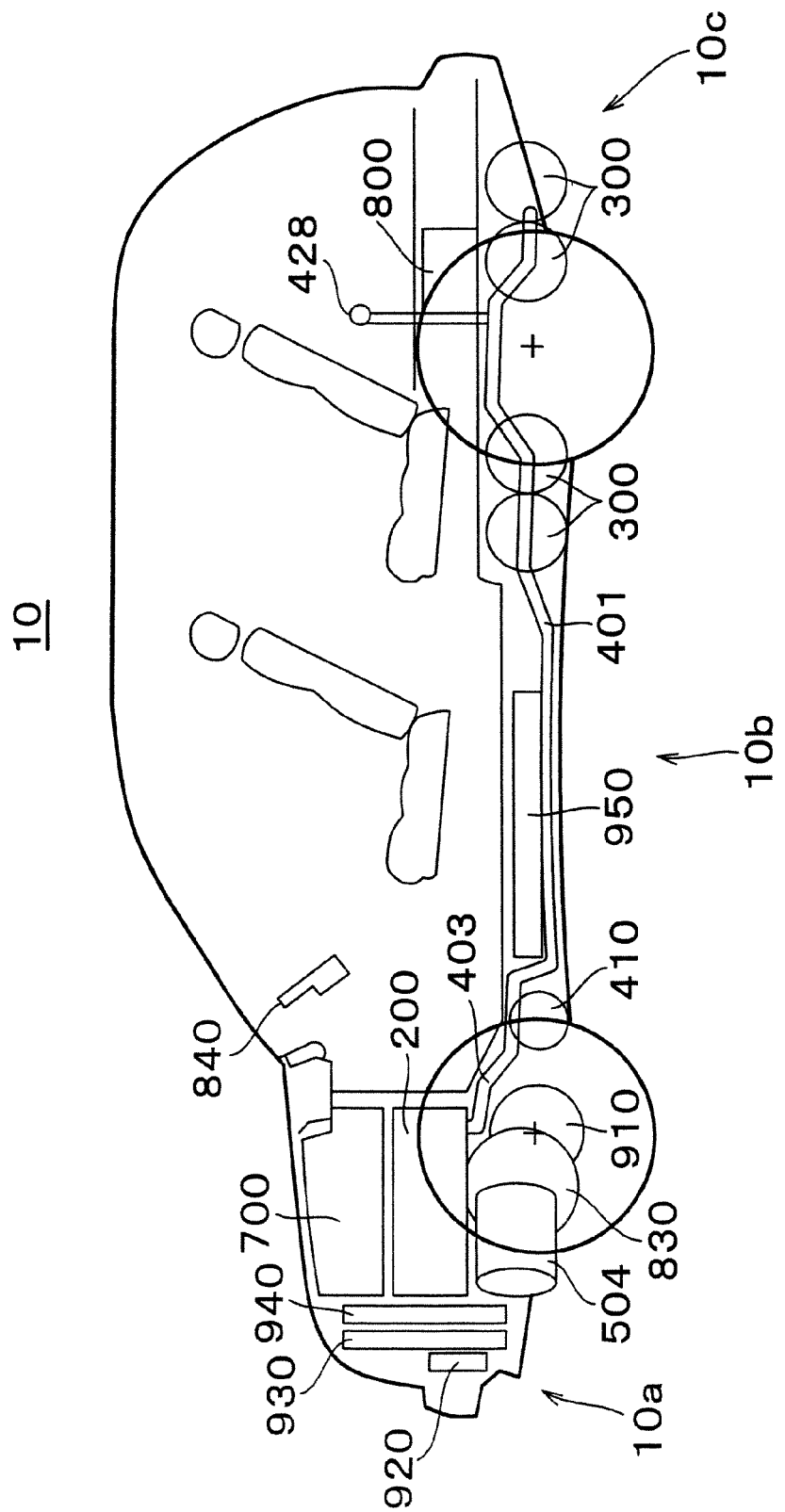
FIG. 4 is an explanatory drawing schematically showing a vertical cross section of a vehicle with the power output device.

FIG. 4 is an explanatory drawing schematically showing a vertical cross section of a vehicle with the power output device. As shown in FIG. 4, the power output device for mounting on a vehicle 100 of the present preferred embodiment is arranged throughout a vehicle 10. Mainly the fuel cell 200, the power control unit 700 and the compressor 504 are arranged in a front part 10a of the vehicle 10. The hydrogen gas channels 401 and 403 and the pump 410 are arranged in an under-floor part 10b. The high-pressure hydrogen tank 300 and the hydrogen gas supplying port 428 are arranged in a rear part 10c.

The drive motor 830 for generating thrust of the vehicle 10 by generated power from the fuel cell 200, a gear 910 for transmitting torque generated from the drive motor 830 to the vehicle axle, a radiator 920 for cooling the drive motor 830, a condenser 930 for an air conditioner, and a main radiator 940 for cooling the fuel cell 200 are arranged in the front part 10a. A sub radiator 950 for cooling the fuel cell 200 is arranged in the under-floor part 10b. The secondary battery 800 for assisting the fuel cell 200 is arranged in the rear part 10c.

B. Electric Power Control Processes

Figure 5:
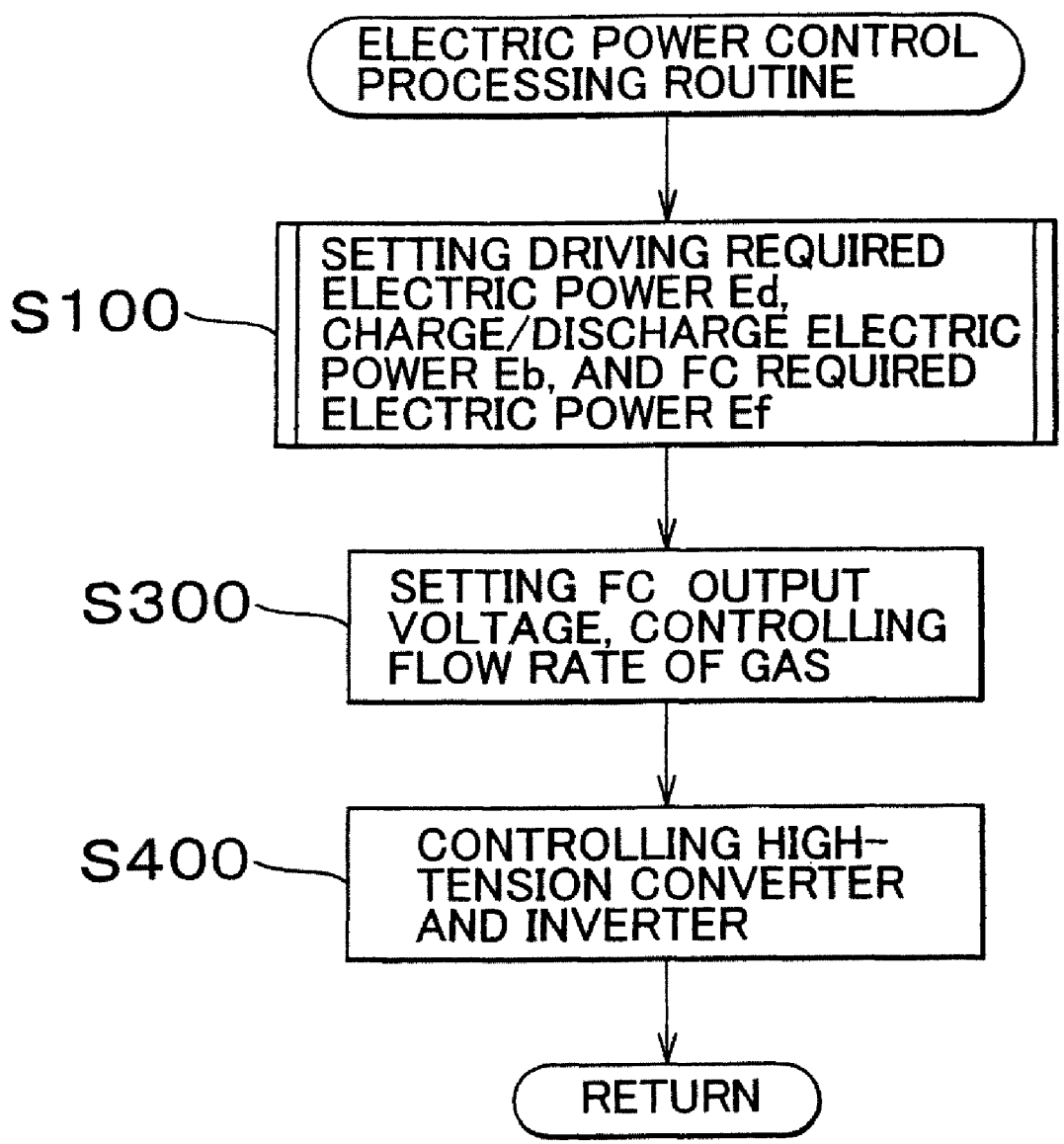
FIG. 5 is a flow chart showing processes of electric power control performed by a power control unit.

FIG. 5 is a flow chart showing processes of electric power control performed by the power control unit 700. The vehicle can be driven since the power control unit 700 repeatedly performs these processes along with the other processes to control driving of the drive motor 830.

According to the processes of electric power control, the first process is to set a driving required electric power Ed, a charge/discharge electric power Eb, and a FC required electric power Ef by a CPU of the power control unit 700 (step 100). The driving required electric power Ed is an electric power which is supplied to the drive motor 830 to drive the vehicle. The charge/discharge electric power Eb is an electric power accompanied by charging and discharging the secondary battery. The FC required electric power Ef is an electric power required of the fuel cell 200.

Figure 6:
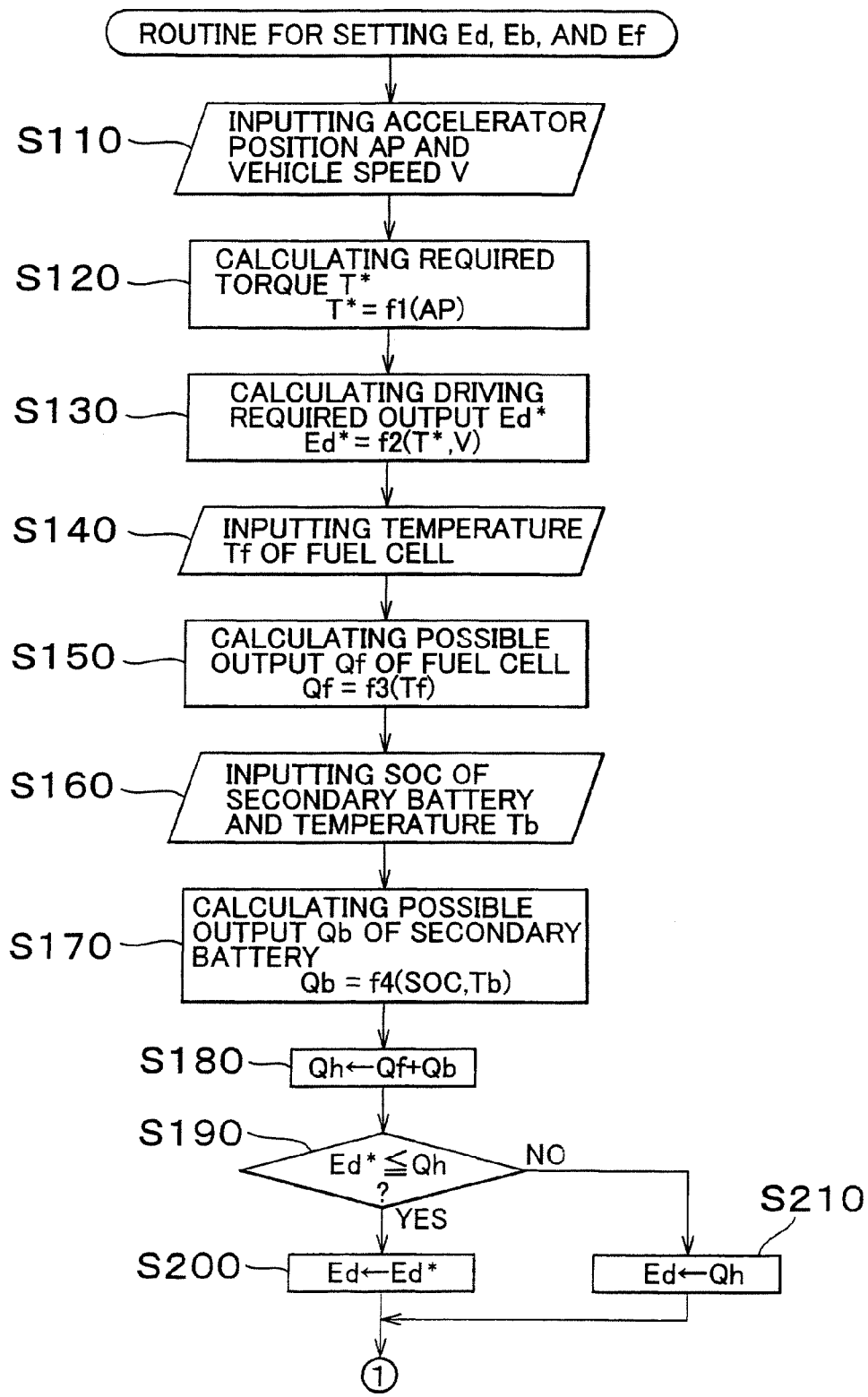
FIG. 6 is a flow chart showing the first half of processes for setting three elements performed at Step S100: electric power Ed, Eb and Ef.
Figure 7:
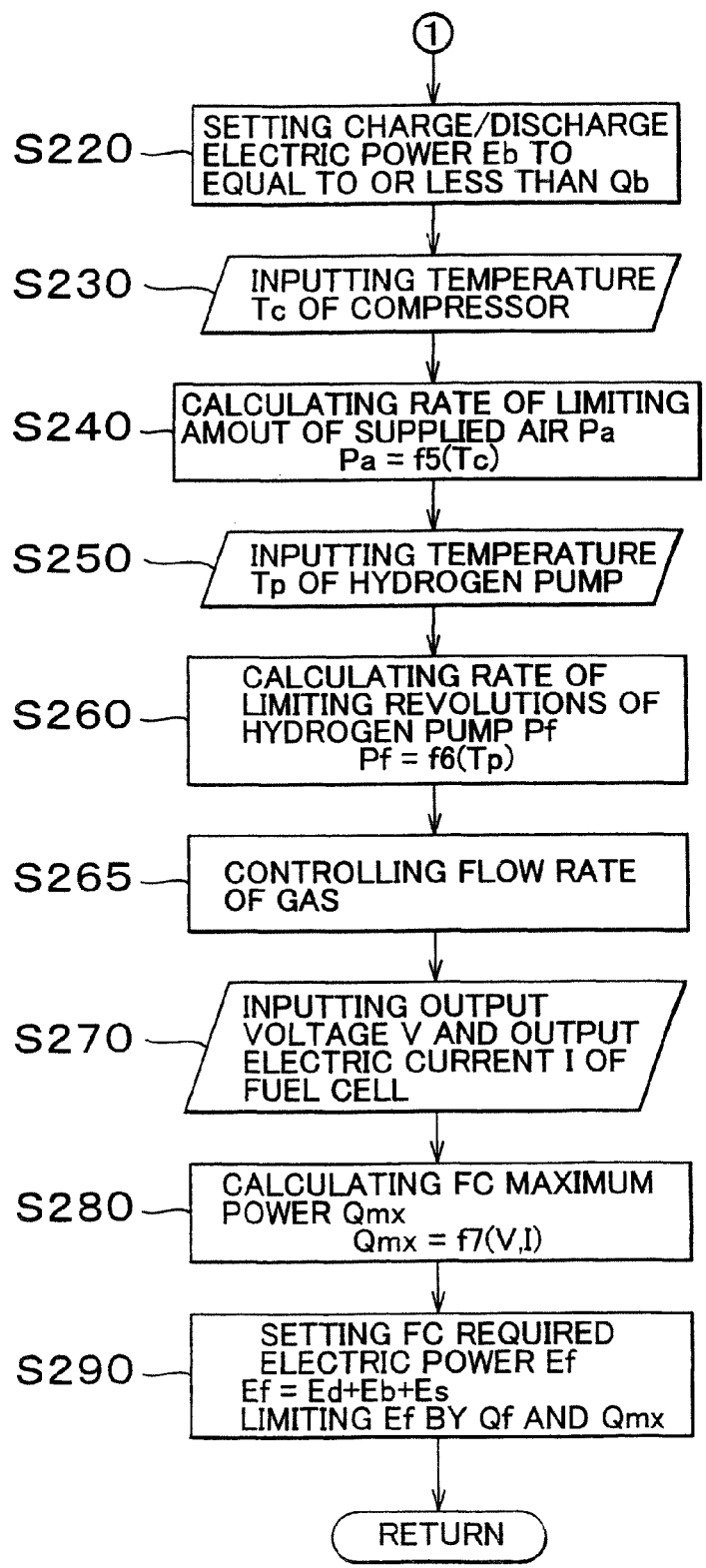
FIG. 7 is a flow chart showing the latter half of processes for setting the electric power Ed, Eb and Ef.

FIGS. 6 and 7 are flow charts specifically showing the processes for setting the three elements carried out at Step S100: the electric power Ed, Eb and Ef. As shown in FIG. 6, the CPU inputs an accelerator position AP detected by the accelerator position sensor 860 and a vehicle speed V detected by the vehicle speed sensor 862 as the first process of the routine (step S10). Then the CPU calculates a required torque T* according to the input accelerator position AP (step S120). An accelerator position AP which is a degree of stepping on the accelerator is directly related to the required torque T* required by a driver so that the required torque T* can be calculated from the accelerator position AP. According to the present preferred embodiment, a relation between the accelerator position AP and the required torque T* is stored in a ROM of the power control unit 700 as a map in advance. Then the required torque T* corresponding to the accelerator position AP is derived from the map to which the accelerator position AP is given.

Then the CPU performs the process of calculating a driving required output Ed* according to the calculated required torque T* and the input vehicle V (step S130). Specifically, a driving required output Ed* is calculated by multiplying the required torque T* by the rotation speed of the vehicle axle calculated from the vehicle speed V.

Figure 8:
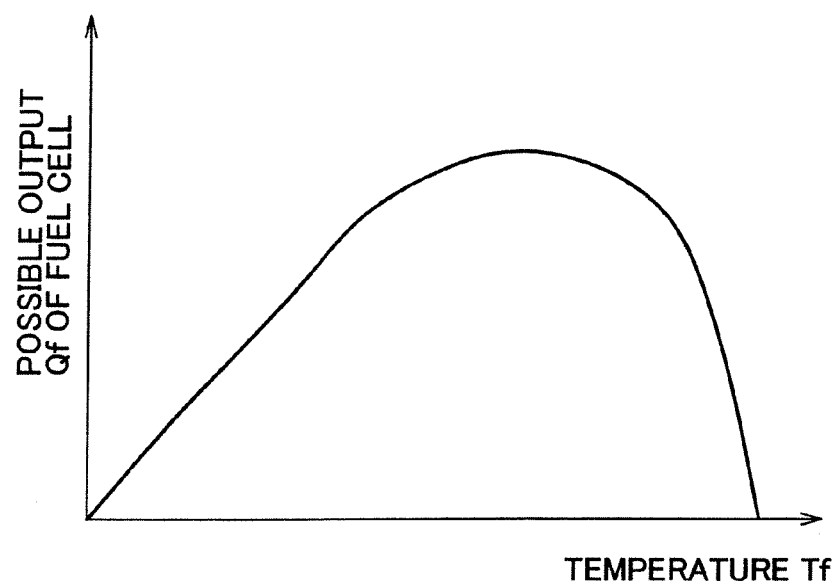
FIG. 8 is a graph showing a relation between a temperature Tf of a fuel cell 200 and a possible output Qf of the fuel cell.

Next, the CPU performs the process of inputting a temperature Tf of the fuel cell 200 detected by the fuel cell temperature sensor 872 (step 140). Then the CPU calculates a possible output Qf of the fuel cell according to the input temperature Tf of the fuel cell 200 (step 150). The possible output Qf of the fuel cell can be calculated according to the temperature Tf since running state of the fuel cell 200 is reflected in the temperature Tf. According to the present preferred embodiment, a relation between the temperature Tf of the fuel cell 200 and the possible output Qf of the fuel cell is determined by experiment and the determined relation is stored in the ROM of the power control unit 700 as a map in advance. Then the possible output Qf of the fuel cell corresponding to the temperature Tf of the fuel cell 200 is derived from the map to which the temperature Tf of the fuel cell 200 is given. FIG. 8 shows an example of a relation between the temperature Tf of a fuel cell 200 and the possible output Qf of the fuel cell. A unit of a possible output Qf is in watts.

Though the possible output Qf of the fuel cell is calculated according to a temperature of the fuel cell 200 at step S150, it may be calculated according to a temperature of the fuel cell and other physical values (sensor output values). As other physical values, a supplied gas pressure of fuel and a temperature of water coolant can be used.

Figure 9:
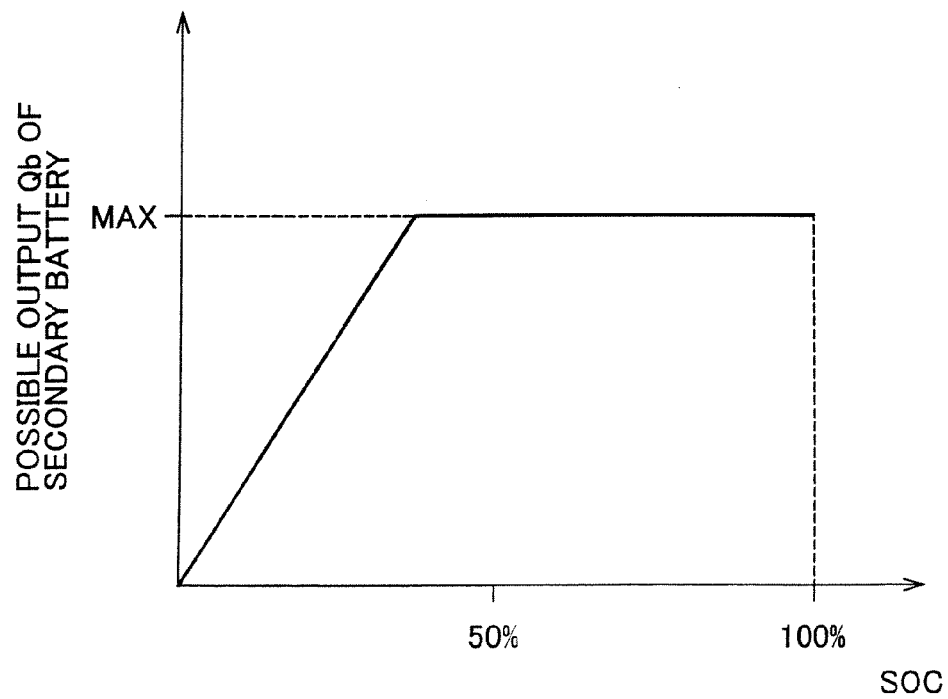
FIG. 9 is a graph showing a relation between a SOC and a possible output Qb of the secondary battery.

Referring back to FIG. 6, the CPU next inputs a SOC of the secondary battery 800 detected from the SOC sensor 864 and a temperature Tb of the secondary battery 800 detected from the secondary battery temperature sensor 866 (step S160). Then the CPU calculates a possible output Qb of the secondary battery according to the input SOC and temperature Tb (step S170). According to the present preferred embodiment, relations among the SOC and the temperature Tb of the secondary battery 800 and the possible output Qb of the secondary battery are determined by experiment and the determined relations are stored in the ROM of the power control unit 700 as a map in advance. Then the possible output Qb of the secondary battery, corresponding to the SOC and a temperature of the secondary battery 800, is derived from the map to which the SOC and the temperature of the secondary battery 800 is given, since a possible output of the secondary battery can be determined according to the SOC and the temperature Tb of the secondary battery 800. FIG. 9 shows an example of a two-dimensional relation between the SOC and the possible output Qb of the secondary battery when the temperature Tb is fixed. A unit of the possible output Qb of the secondary battery is in watts.

Though the possible output Qb of the secondary battery is calculated according to the SOC and a temperature of the secondary battery 800 at step S170, it may be calculated according to both the SOC and the temperature, and other physical values (sensor output values). As other physical values, a voltage, an electric current and a density of electrolytic solution for a lead-acid battery can be used.

Referring back to FIG. 6, the CPU next stores the sum of the possible output Qf of the fuel cell calculated at step S150 and the possible output Qb of the secondary battery calculated at step S170 as an allowable drive output Qh of the drive motor 830 (step S180). Then the CPU determines whether the Ed* calculated at step S130 is equal to or less than the allowable drive output Qh calculated at step S180 or not (step S190). If the CPU determines that the Ed* is equal to or less than the Qh, the CPU stores the Ed* as the driving required electric power Ed set at the step S100 (step S200). On the other hand, if the CPU determines that the Ed* is higher than the Qh, the CPU stores the allowable drive output Qh as the driving required electric power Ed (step S210).

After the CPU finishes the processes at step S200 or S210, the CPU performs the process of setting the charge/discharge electric power Eb at step S220 shown in FIG. 7. At this step, the CPU calculates the charge/discharge electric power Eb in consideration of the allowable drive output Qh calculated at step S180; however, the CPU restrains the charge/discharge electric power Eb to be equal to or less than the possible output Qb of secondary battery.

Next, the CPU inputs a temperature Tc around the motor for the compressor 504 detected by the temperature sensor 507 (step S230). Then the CPU calculates a rate of limiting the amount of supplied air Pa according to the input temperature Tc (step S240). As described above, temperatures at the motor 504m for the compressor 504 and the inverter connected to the motor 504m rise since they generate heat internally due to loss. If their temperatures rise excessively, it may accelerate degradation of insulators and have an adverse effect on bearings and commutators. To prevent the above-mentioned problem, the CPU restrains the amount of oxidizing gas supplied by the compressor 504 according to the temperature Tc around the motor for the compressor 504 to restrain the rotational speed of the motor 504m.

Figure 10:
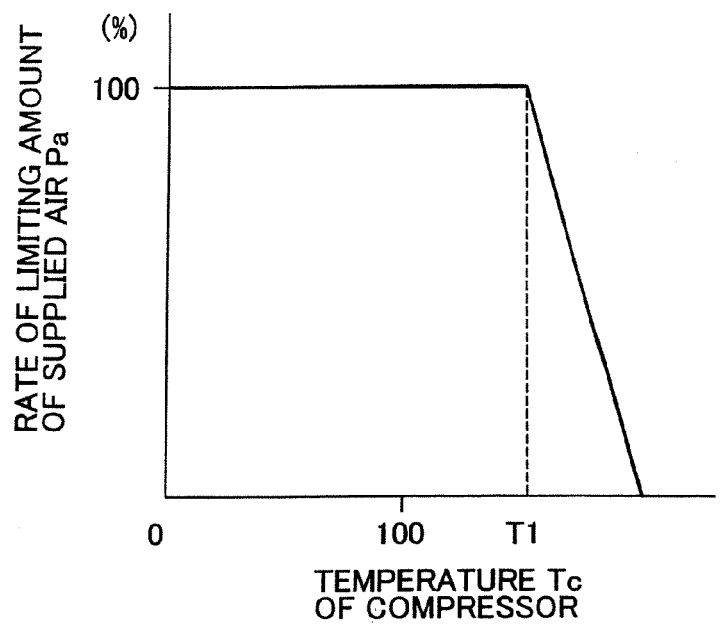
FIG. 10 is a graph showing a relation between a temperature Tc around a motor of a compressor and a rate of limiting the amount of supplied air Pa.

According to the present preferred embodiment, a relation between the temperature Tc and a rate of limiting the amount of supplied air Pa is determined by experiment and the determined relation is stored in the ROM of the power control unit 700 as a map in advance. Then a rate of limiting the amount of supplied air Pa corresponding to the temperature Tc around the motor is derived from the map to which the temperature Tc around the motor is given. FIG. 10 shows an example of a relation between the temperature Tc around the motor for the compressor 504 and a rate of limiting the amount of supplied air Pa. As shown, when the temperature Tc around the motor for the compressor 504 exceeds a predetermined value Ti (>100° C.), a rate of limiting the amount of supplied air Pa gradually drops as the temperature Tc rises. The units of a rate of limiting the amount of supplied air Pa are percentages.

Referring back to FIG. 7, the CPU inputs a temperature Tp around the motor for the pump 410 (a hydrogen pump hereafter) detected by the temperature sensor 409 (step S250) after performing step S240. Then the CPU calculates a rate of limiting the rotational speed of the hydrogen pump Pf according to the input temperature Tp (step S260). As described above, temperatures at the motor 410m for the hydrogen pump 410 and the inverter connected to the motor 410m rise since they generate heat internally due to loss. If their temperatures rise excessively, it may accelerate degradation of insulators and have an adverse effect on bearings and commutators. To prevent the above-mentioned problem, the CPU restrains the rotational speed of the motor 410m for the hydrogen pump 410 according to the temperature Tp around the motor for the hydrogen pump 410.

According to the present preferred embodiment, a relation between the temperature Tp and a rate of limiting the rotational speed of the hydrogen pump Pf is determined by experiment and the determined relation is stored in the ROM of the power control unit 700 as a map in advance. Then a rate of limiting the rotational speed of the hydrogen pump Pf corresponding to the temperature Tp is derived from the map to which the temperature Tp is given. Like the map for calculating a rate of limiting the amount of supplied air Pa shown in FIG. 10, a rate of limiting the rotational speed of the hydrogen pump Pf gradually drops as the temperature Tc rises when the temperature Tp exceeds a predetermined value (>100° C.). The units of the rate of limiting the rotational speed of the hydrogen pump Pf is in percentages. Though a rate of limiting the rotational speed of the hydrogen pump Pf is used as a parameter corresponding to the temperature Tp according to the present preferred embodiment, the amount of hydrogen supplied, which is equivalent to a rate of limiting the rotational speed of the hydrogen pump Pf, may instead be used as a parameter.

Referring back to FIG. 7, the CPU restrains the rotational speed of the hydrogen pump 410 to assure that the rotational speed does not exceed the rate of limiting the rotational speed of the hydrogen pump Pf calculated at step S260, as well as restraining supply of oxidizing gas to assure that the supply does not exceed the rate of limiting the amount of supplied air Pa calculated at step S240 (step S265) after performing step S260. The CPU next inputs an output voltage V and an output electric current I detected by the voltage sensor 868 and the electric current sensor 870 respectively (step S270). Then the CPU calculates a FC maximum power Qmx according to the input output voltage V and output electric current I (step S280). The FC maximum power Qmx is a parameter indicating a maximum output of the fuel cell 200 under a sufficient voltage (a rated voltage, for example, 240V).

Figure 11:
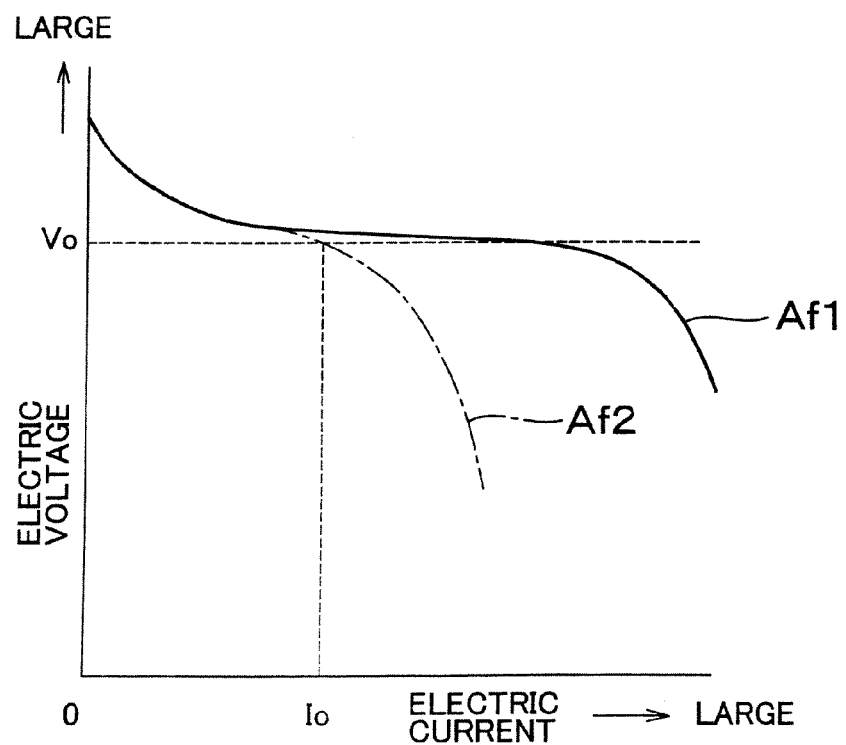
FIG. 11 is a graph showing a voltage-current characteristic map of the fuel cell.

FIG. 11 shows a voltage-current characteristic map of the fuel cell 200. An Af1 curve shows that the fuel cell is under normal conditions and an Af2 curve shows that the fuel cell's performance has dropped because the fuel cell has been left unattended for a long period. If the fuel cell's performance has dropped, a point where a voltage begins to drop shifts to the side of a lower electric current as shown in the graph. When a voltage is the rated voltage ($V_0$, for example, 240V), the electric current is extremely low so that a required electric current cannot be output. To obviate the problem above, the power control unit 700 calculates a voltage-current characteristic map of the fuel cell 200 from the output voltage V and the output electric current I detected by the voltage sensor 868 and the electric current sensor 870, respectively. Next, the power control unit 700 calculates an output electric current ($I_0$) according to the voltage-current characteristic map. Then the power control unit 700 calculates the FC maximum power Qmx from the product of $V_0$ and $I_0$ and specifies that the calculated FC maximum power Qmx is an upper limit of a possible output of the fuel cell 200.

When supplies of fuel gas and oxidizing gas are not sufficient, the output voltage $V_0$ cannot be obtained even from a maximum electric current determined by both the supplies. In this case, the FC maximum power Qmx is set to be an output under an output voltage determined from the maximum electric current. In other words and specifically, the FC maximum power Qmx is calculated according to supplies of the fuel gas and the oxidizing gas in addition to an output voltage V and an output electric current I of the fuel cell.

Referring back to FIG. 7, the CPU performs the process of setting the FC required electric power Ef, which is a required electric power from the fuel cell 200 (step S290), after performing step S280. The FC required electric power Ef is calculated from the sum of the three elements: the driving required electric power Ed set at step S200 or S210, the charge/discharge electric power Eb set at step 220, and an auxiliary machine electric power Es. An auxiliary machine electric power Es is a required electric power to drive the vehicle auxiliary machine 852 and the FC auxiliary machine 854. If the value calculated from the sum of the three elements exceeds either the possible output of the fuel cell Qf calculated at step S150 or the FC maximum power Qmx calculated at step S280, the value is set to be the FC required electric power Ef at step S290.

After carrying out step S290, the processes of the routine for setting Ed, Eb, and Ef are ended by proceeding to "return". According to the routine, four parameters corresponding to a possible electric power from the fuel cell 200, which are the possible output Qf of the fuel cell, the FC maximum power Qmx, a rate of limiting the amount of supplied air Pa and a rate of limiting the rotational speed of the hydrogen pump Pf, are used to restrain the FC required electric power Ef so that an output from the fuel cell 200 is restrained.

In addition, the possible output Qb of the secondary battery as a parameter corresponding to a possible electric power from the secondary battery 800 is used to restrain the charge/discharge electric power Eb so that an output from the secondary battery 800 is restrained. Furthermore, the allowable drive output Qh as a parameter corresponding to the sum of a possible electric power from the fuel cell 200 and the secondary battery 800 is used to restrain the driving required electric power Ed so that an output from the drive motor 830 is restrained.

Figure 12:
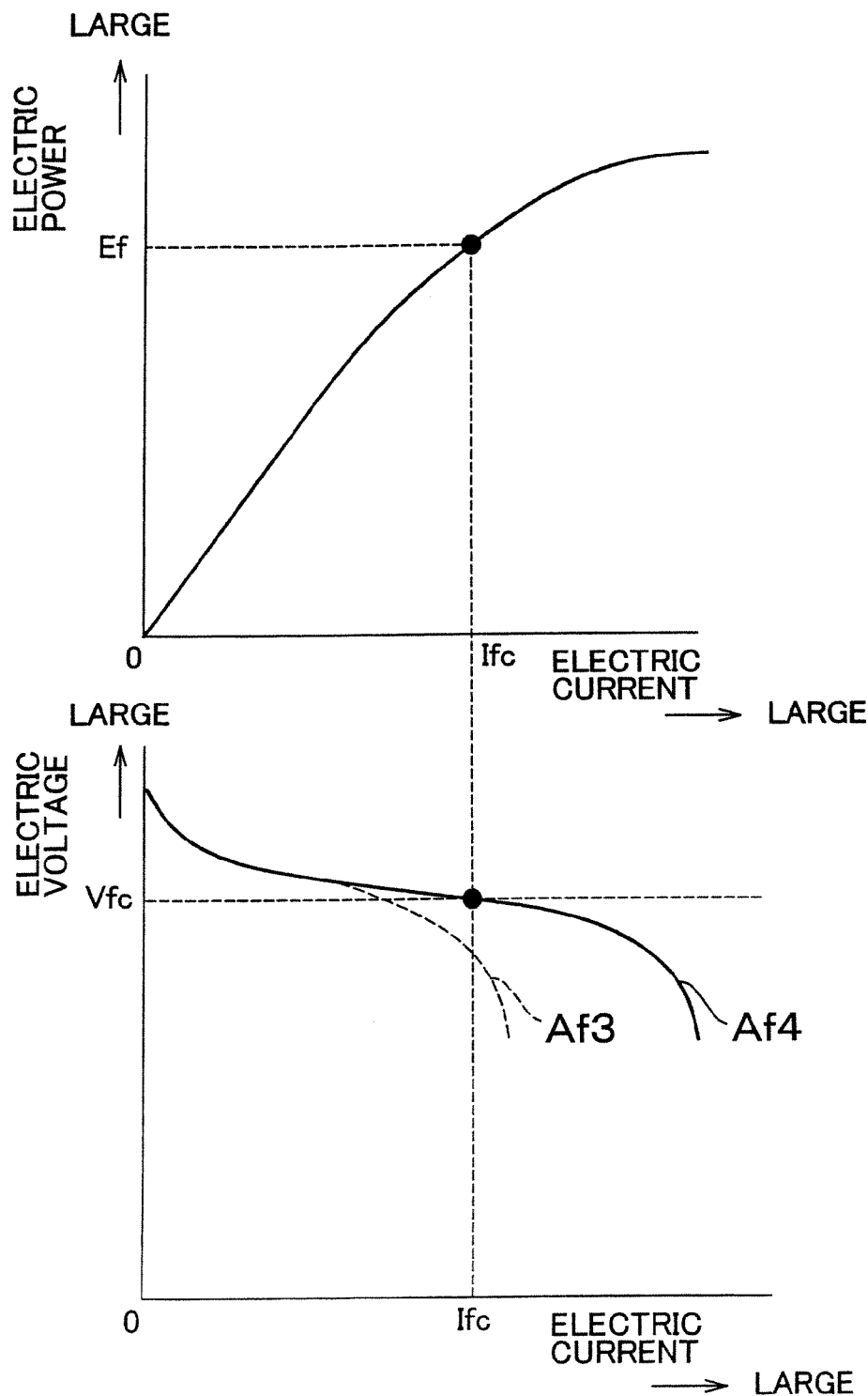
FIG. 12 is an explanatory drawing showing an output characteristic of the fuel cell.

When the processes of the routine for setting Ed, Eb, and Ef (step S100 in FIG. 5) are ended, the CPU proceeds to the next routine (step S300). At this step, the CPU sets an output voltage of the fuel cell 200 to secure that the FC required electric power Ef set at step S100 is output and restrains a flow rate of gas in the fuel cell 200. A voltage is set from the following maps. FIG. 12 is an explanatory drawing showing an output characteristic of the fuel cell 200. The upper graph shows a relation between an electric power and an electric current and the lower graph shows a relation between a voltage and an electric power.

An output characteristic of the fuel cell 200 fluctuates according to a flow rate of the supplied gas. In the lower graph, an Af3 curve shows that the flow rate of the gas is low and an Af4 curve shows that the flow rate of the gas is high. If the rate is low, a point where the voltage begins to drop shifts to the side of a low electric current.

An electric current Ifc corresponding to the FC required electric power Ef can be calculated according to an electric power-electric current characteristic map shown in the upper graph. A voltage Vfc corresponding to the electric current Ifc can be calculated according to a voltage-electric current characteristic map shown in the lower graph. If the flow rate of the gas in the fuel cell 200 is low and a required electric power with a sufficient voltage cannot be output, a target value of the flow rate of the gas is set according to these characteristic maps.

Referring back to FIG. 5, the power control unit 700 then controls an output voltage of the high-tension converter 810 to obtain the output voltage of the fuel cell 200 set at step S300 and the charge/discharge electric power Eb set at step S100, as well as controlling the inverter 820 to assure that a required electric power is supplied to the drive motor 830 (step S400). An electric power according to the flow rate of the gas is output from the fuel cell 200 accompanied by switching of the inverter 820. An electric power according to a difference between an electric power output from the fuel cell 200 and an electric power consumed at the inverter 820 is charged into or discharged from the secondary battery 800. When the output from the fuel cell 200 responds more slowly than expected, electric power, which is a difference between the FC required electric power Ef and the actual electric power, is supplemented by the secondary battery 800. The electric power from the secondary battery 800 gradually drops as the output from the fuel cell 200 reaches closer to the FC required electric power Ef. With the above-described controls, electric power can be supplied with high responsiveness.

The electric power from at least the secondary battery is assuredly supplied to the vehicle auxiliary machine 852 and the FC auxiliary machine 854. When the secondary battery is charged, electric power either from the fuel cell 200 or the drive motor 830 may be supplied to these auxiliary machines.

C. Control Processes of the Output Limitation Warning Lamp

Figure 13:
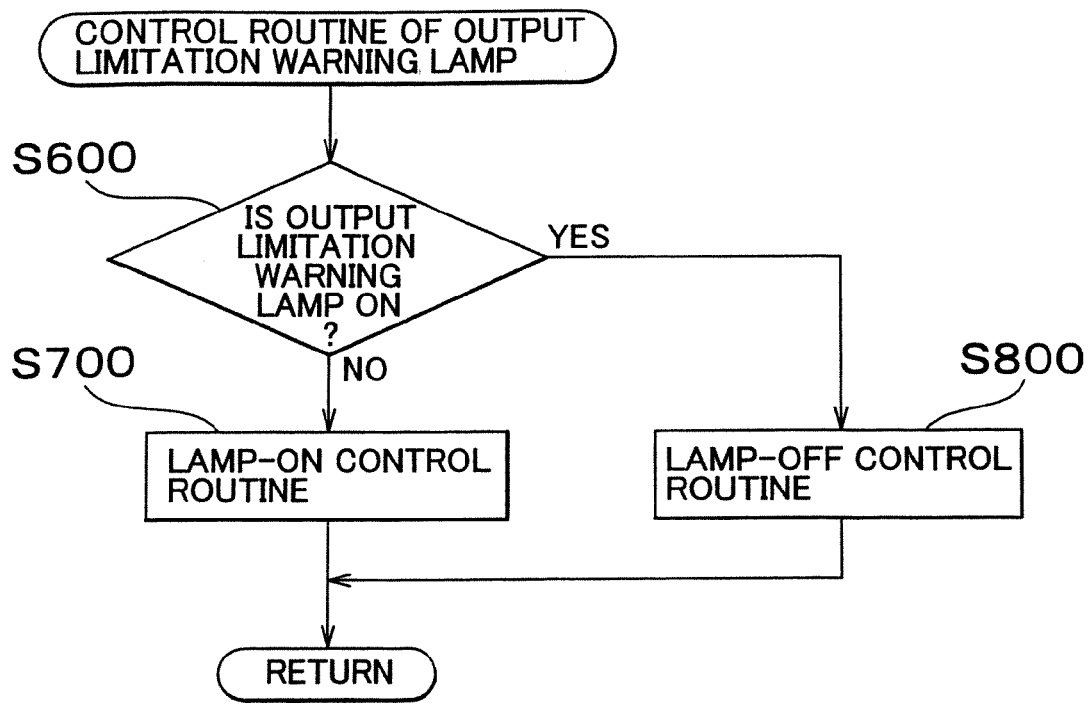
FIG. 13 is a flow chart showing a control routine controlling turning on and off an output 1 imitation warning lamp 842.

FIG. 13 is a flow chart showing a control routine controlling turning on and off an output limitation warning lamp 842. This control routine is repeatedly performed after every predetermined period. As shown in the flow chart, the CPU of the power control unit 700 determines whether the output limitation warning lamp 842 is currently on or not at the first process of the routine (step S600). If the CPU determines that the lamp is not on (off), the CPU carries out a lamp-on control routine for turning on the output limitation warning lamp 842 (step S700). On the other hand, if the CPU determines that the lamp is on, the CPU carries out a lamp-off control routine for turning off the output limitation warning lamp 842 (step S800). After carrying out step S700 or step S800, the CPU ends this control routine for the moment by proceeding to "return."

Figure 14:
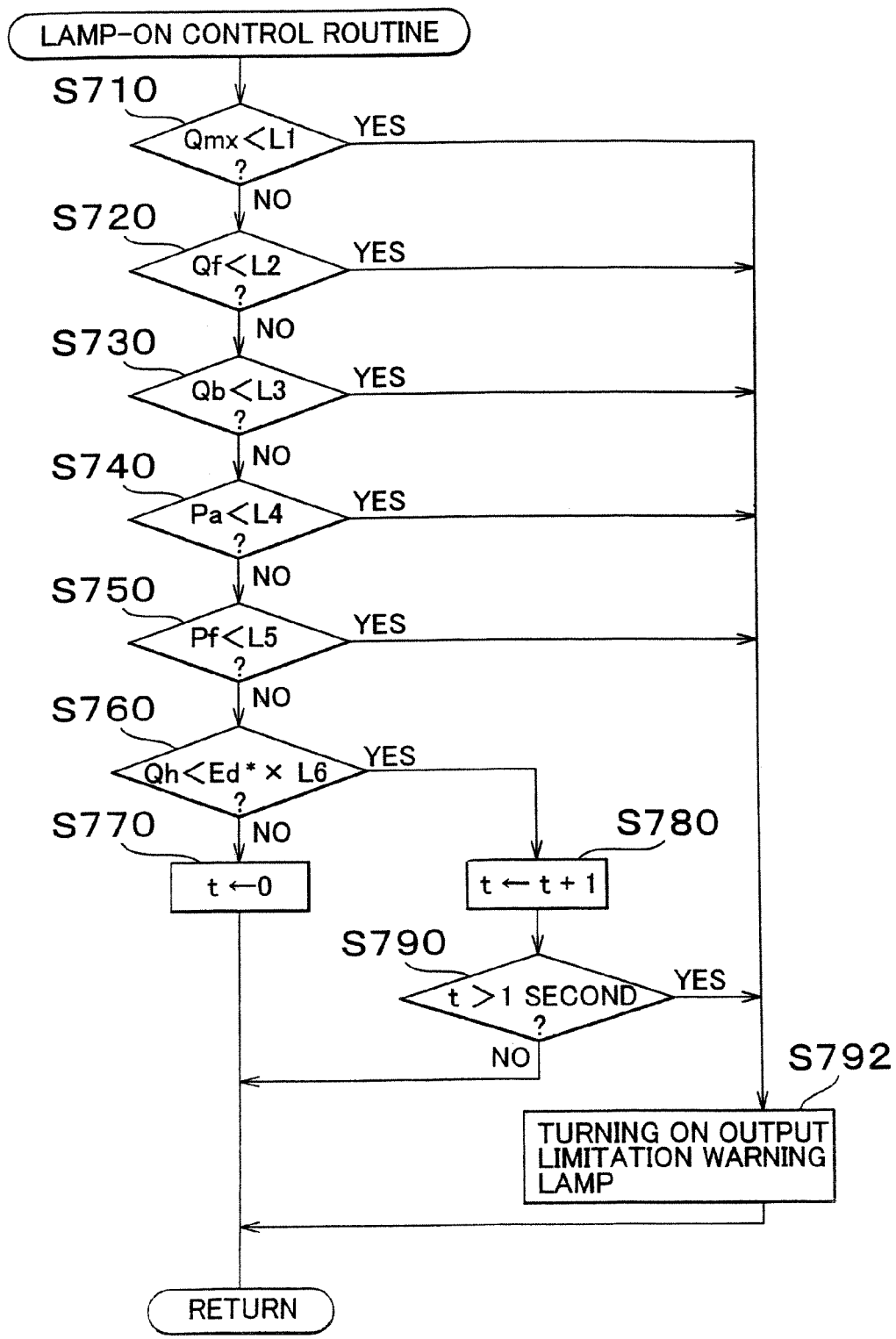
FIG. 14 is a flow chart showing a lamp-on control routine in detail.

FIG. 14 is a flow chart showing a lamp-on control routine in detail. When this routine begins, the CPU determines if the following conditions from the first condition to the sixth one are met.

The first on-condition; the CPU determines whether the FC maximum power Qmx, which is one of the parameters calculated in the electric power control processing routine, is less than a predetermined value L1 (step S710).

The second on-condition; the CPU determines whether the possible output Qf of the fuel cell, which is one of the above-mentioned parameters, is less than a predetermined value L2 (step S720).

The third on-condition; the CPU determines whether the possible output Qb of the secondary battery, which is one of the above-mentioned parameters, is less than a predetermined value L3 (step S730).

The fourth on-condition; the CPU determines whether the rate of limiting the amount of supplied air Pa, which is one of the above-mentioned parameters, is less than a predetermined value L4 (step S740).

The fifth on-condition; the CPU determines whether the rate of limiting the rotational speed of the hydrogen pump Pf, which is one of the above-mentioned parameters, is less than a predetermined value L5 (step S750).

The sixth on-condition; the CPU determines whether the allowable drive output Qh, which is one of the above-mentioned parameters and the sum of the possible output Qf of the fuel cell and the possible output Qb of the secondary battery, is less than a value calculated by multiplying the required output Ed* calculated at step S130, which is a step before carrying out the output limitation, by a predetermined value L6 (step S760). Then the CPU determines whether the determination result of step S760 has been continuously affirmative for more than one second (step S770, S780, and step S790). The above-mentioned predetermined values L1 through L6 are constant values stored in the ROM of the power control unit 700 in advance.

If any of the above-mentioned on-conditions is met, the CPU proceeds to step S792 and turns on the output limitation warning lamp 842. Then the CPU proceeds to "return." On the other hand, if none of the above-mentioned on-conditions is met, the CPU proceeds to "return."

Figure 15:
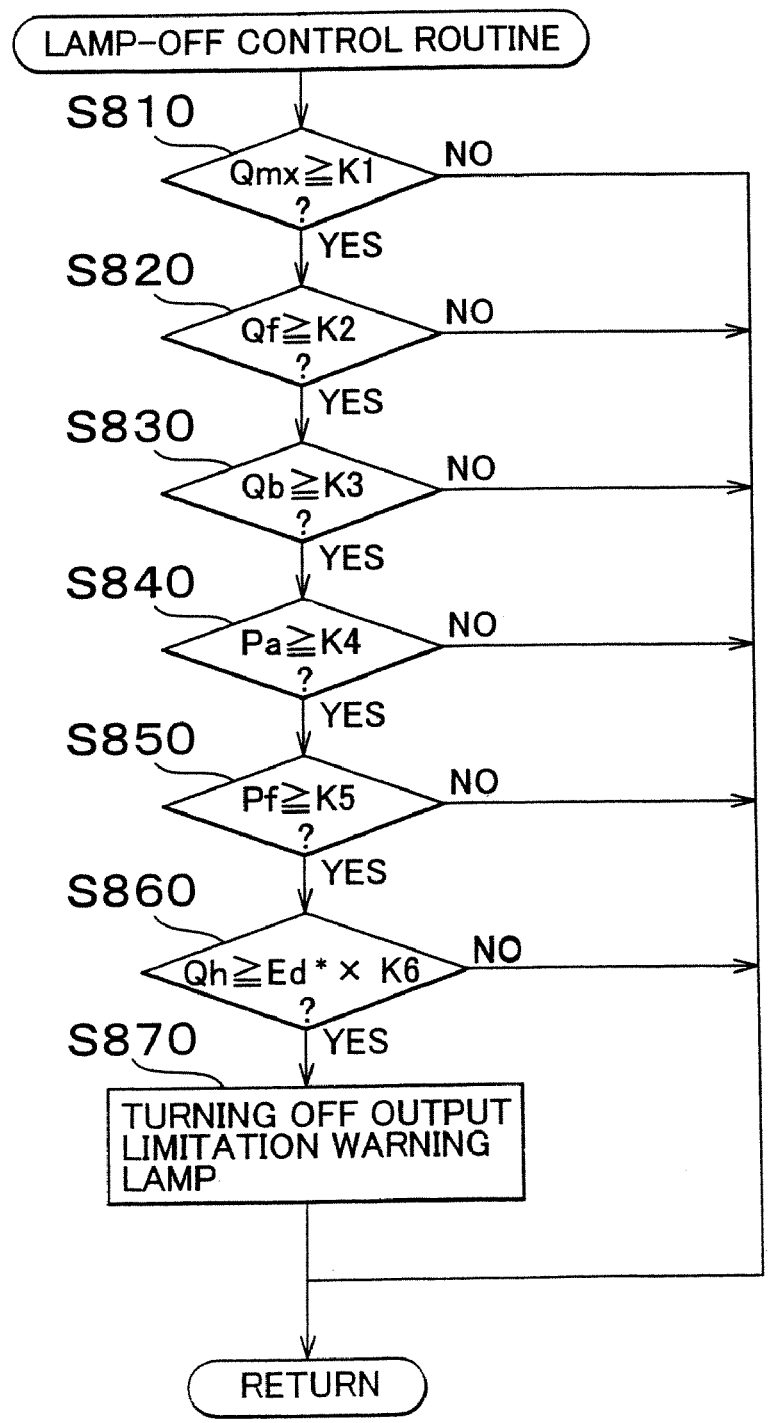
FIG. 15 is a flow chart showing a lamp-off control routine in detail.

FIG. 15 is a flow chart showing a lamp-off control routine in detail. When this routine begins, the CPU determines if the following conditions from the first condition to the sixth one are met.

The first off-condition; the CPU determines whether the FC maximum power Qmx, which is one of the parameters calculated in the electric power control routine, is equal to or more than a predetermined value K1 (step S810).

The second off-condition; the CPU determines whether the possible output Qf of the fuel cell, which is one of the above-mentioned parameters, is equal to or more than a predetermined value K2 (step S820).

The third off-condition; the CPU determines whether the possible output Qb of the secondary battery, which is one of the above-mentioned parameters, is equal to or more than a predetermined value K3 (step S830).

The fourth off-condition; the CPU determines whether the rate of limiting the amount of supplied air Pa, which is one of the above-mentioned parameters, is equal to or more than a predetermined value K4 (step S840).

The fifth off-condition; the CPU determines whether the rate of limiting the rotational speed of the hydrogen pump Pf, which is one of the above-mentioned parameters, is equal to or more than a predetermined value K5 (step S850).

The sixth off-condition; the CPU determines whether the allowable drive output Qh, which is one of the above-mentioned parameters and the sum of the possible output Qf of the fuel cell and the possible output Qb of the secondary battery, is equal to or more than a value calculated by multiplying the required output Ed* calculated at step S130, which is a step performed before carrying out the output limitation, by a predetermined value K6 (step S860). The above-mentioned predetermined values K1 through K6 are constant values stored in the ROM of the power control unit 700 in advance.

If all of the above-mentioned off-conditions are met, the CPU proceeds to step S870 and turns off the output limitation warning lamp 842. Then the CPU proceeds to "return." On the other hand, if any of the above-mentioned off-conditions is not met, the CPU proceeds to "return." The predetermined values K1 through K6 in the lamp-off control routine for comparing the off-conditions are smaller than the predetermined values L1 through L6 in the lamp-on control routine for comparing the on-conditions, respectively, due to providing hysteresis between the on control and the off control.

D. Effects

According to the preferred embodiment as comprised above, the output limitation warning lamp 842 is turned on when the possible output Qf of the fuel cell is less than the predetermined value L2. According to the preferred embodiment, a driver can immediately be notified that the possible output of the fuel cell 200 has been reduced, through turning on the output limitation warning lamp 842 since the output limitation warning lamp 842 is provided at the combination meter 840 in the instrument panel.

The output limitation warning lamp 842 is also turned on when the FC maximum power Qmx is less than the predetermined value L2. Even when the possible output of the fuel cell 200 is reduced because of limitation of the FC maximum power Qmx, the driver can be notified of the shortage since the output limitation warning lamp 842 is also turned on. Furthermore, the output limitation warning lamp 842 is turned on when the rate of limiting the amount of supplied air Pa is less than the predetermined value L4 or the rate of limiting the rotational speed of the hydrogen pump Pf is less than predetermined value L5. Even when the air supply is limited by the rate of limiting the amount of supplied air Pa and the rotational speed of the hydrogen pump is limited by the rate of limiting the rotational speed of the hydrogen pump Pf so that a possible output of the fuel cell 200 is limited and in short supply, the driver can immediately be notified of the shortage through turning on the output limitation warning lamp 842.

In addition, the output limitation warning lamp 842 is also turned on when the possible output Qb of the secondary battery is less than the predetermined value L3 according to the preferred embodiment. Even when a possible output of the secondary battery 800 is limited in the possible output Qb of the secondary battery and in short supply, the driver can immediately be notified of the shortage through turning on the output limitation warning lamp 842.

Furthermore, the output limitation warning lamp 842 is also turned on when the allowable drive output Qh, which is the sum of the possible output Qf of the fuel cell and the possible output Qb of the secondary battery, is less than the required output Ed* calculated at step S130, which is a step before carrying out the output limitation, to more than a certain extent. Even when the sum of an electric power from the fuel cell 200 and the secondary battery 800 is in short supply, the driver can immediately be notified of the shortage through the turning on of the output limitation warning lamp 842.

According to the preferred embodiment, turning on the output limitation warning lamp 842 is carried out through two configurations. One is based on each parameter corresponding to a possible electric power from the fuel cell 200, which are the possible output Qf of the fuel cell, the FC maximum power Qmx, the rate of limiting the amount of supplied air Pa, and the rate of limiting the rotational speed of the hydrogen pump Pf. The other is based on a parameter corresponding to a possible electric power from the secondary battery 800, which is the possible output Qb of the secondary battery. Therefore, the driver can be notified of an output shortage more accurately.

Though this configuration, in which the output limitation warning lamp 842 is turned on, is adopted as a notification means to notify a driver of a power shortage according to the preferred embodiment, a configuration in which a warning buzzer is rung may instead be adopted. In addition, the driver may be notified of the power shortage through a sense of touch by vibration. Furthermore, a configuration in which each parameter is indicated on a display, in addition to turning on the output limitation warning lamp 842, may be adopted. It is preferable that normal values be indicated when the configuration in which each parameter is indicated is adopted.

Though the predetermined values L1 through L6 in the lamp-on control routine for comparing the on-conditions are constant values, they may be other physical values, for example they may be variables fluctuating according to a state of the fuel cell or that of the secondary battery. Regarding the predetermined values K1 through K6 in the lamp-off control routine for comparing the off-conditions, they may also be similar variables.

The Second Preferred Embodiment

E. Device Configuration

The following explains the second preferred embodiment. Compared with the first preferred embodiment, a power output device for mounting on a vehicle according to the second preferred embodiment includes much the same hardware configuration. The same parts are numbered the same as in the first preferred embodiment. A gas system of the second preferred embodiment is exactly the same with the one of the first preferred embodiment. Regarding the electric system, only the configuration of the combination meter is different from that of the combination meter of the first preferred embodiment, and the other configurations are the same.

Figure 16:
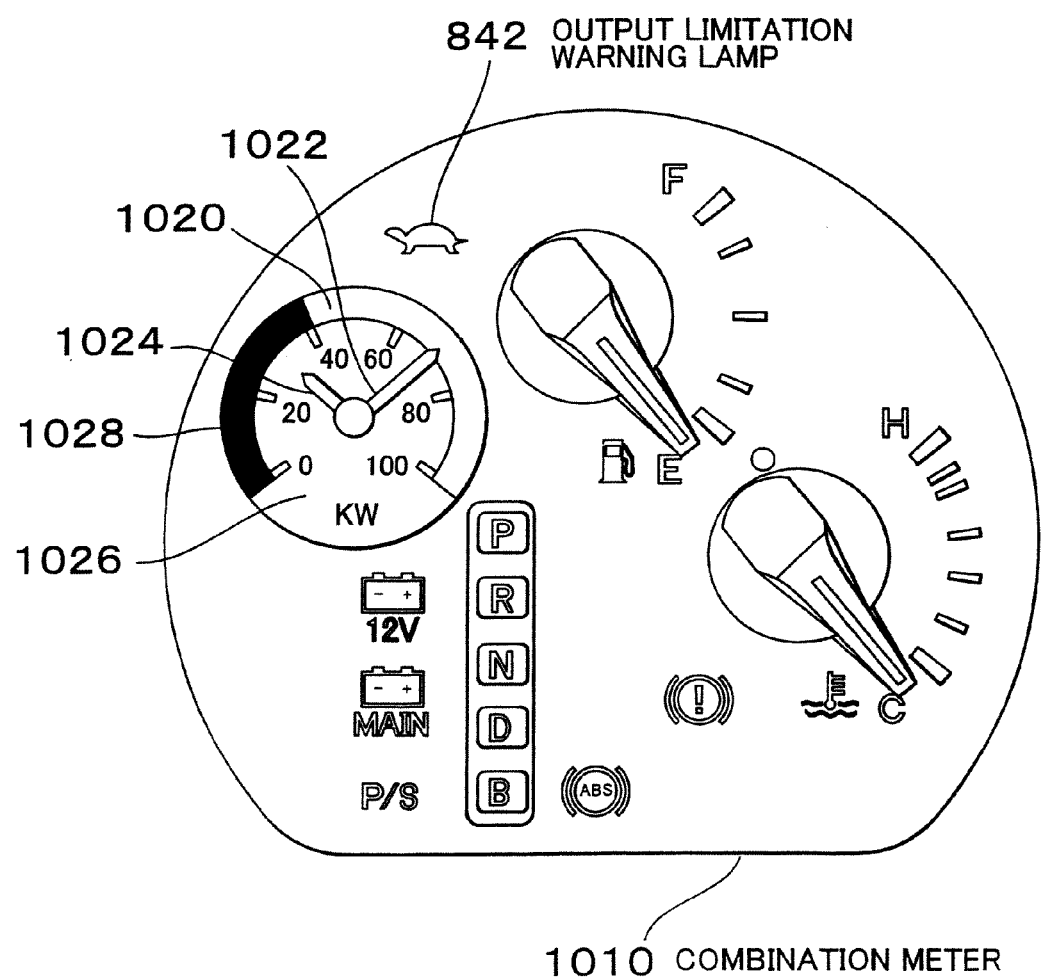
FIG. 16 is an explanatory drawing showing an example of a combination meter according to a second preferred embodiment.

FIG. 16 is an explanatory drawing showing an example of a combination meter 1010 according to the second preferred embodiment. As shown, a combination meter 1010 includes the same configuration as that of the first preferred embodiment except for a power meter 1020 added to the configuration. The power meter 1020 is a meter showing a possible maximum electric power PWmx from the power output device for mounting on a vehicle and an electric power PW currently output from the power output device for mounting on a vehicle. The power meter 1020 is an analog meter including two pointers: a long hand 1022 and a short hand 1024. The long hand 1022 shows the maximum electric power PWmx and the short hand shows the electric power PW currently output.

A scale board 1026 of the power meter 1020 includes a scale showing an electric power whose unit is KW. Furthermore, a zone 1028 with values equal to or less than a predetermined value P0 (40 KW, for example) is colored in red indicating a power shortage as shown. The zone 1028 is called a red zone.

Figure 17:
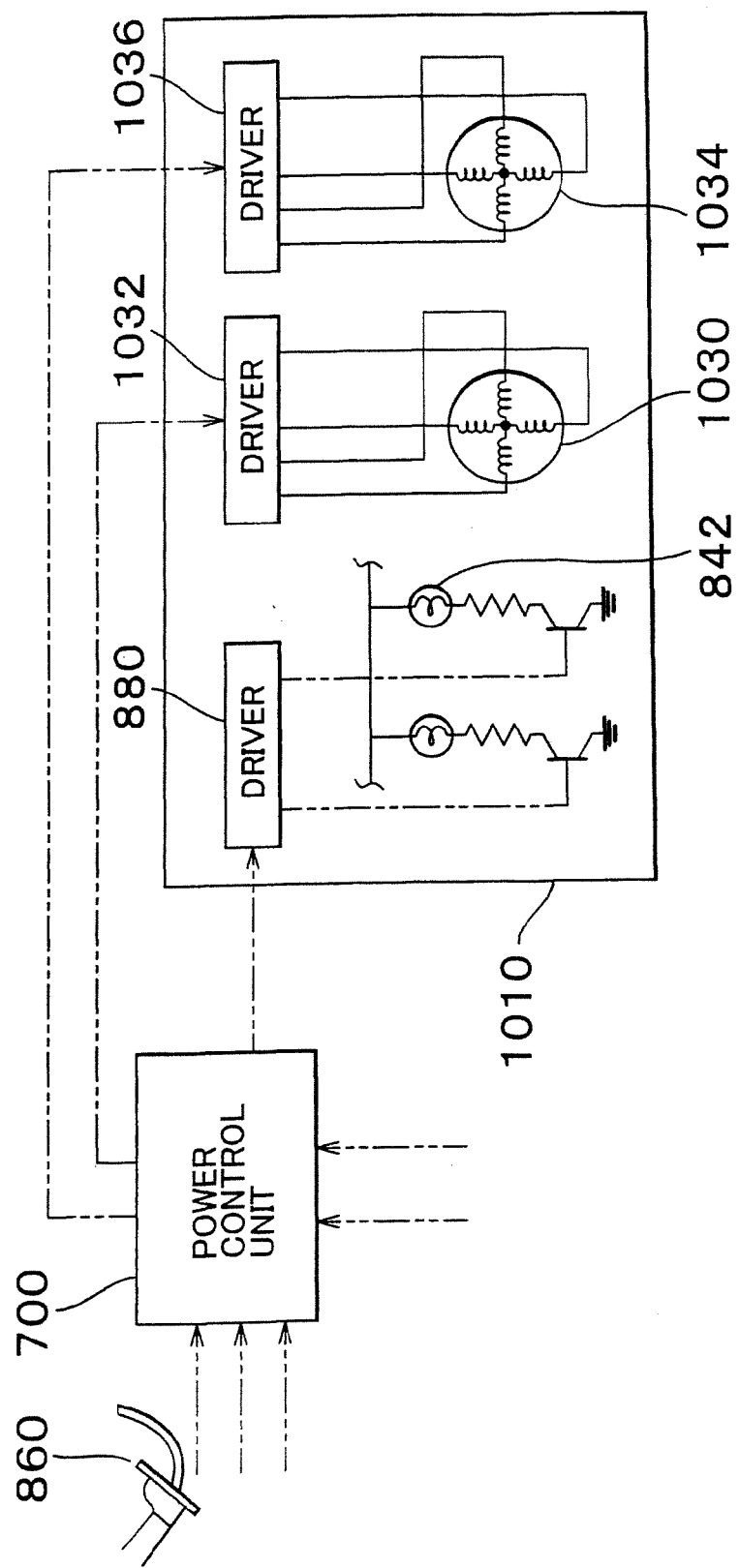
FIG. 17 is a block diagram of an electric system for driving the combination meter.

FIG. 17 is a block diagram of the electric system for driving the combination meter 1010. As shown, the combination meter 1010 is provided with the output limitation warning lamp 842 and its driver 880. In addition, a first crossed coil 1030 connected to the long hand 1022 of the power meter 1020, a driver 1032 for driving the first crossed coil 1030, a second crossed coil 1034 connected to the short hand 1024 of the power meter 1020, and a driver 1036 for driving the second crossed coil 1034 are provided at the combination meter 1010. The drivers 880, 1032 and 1036 are controlled by the power control unit 700.

F. Meter Control Processes

Figure 18:
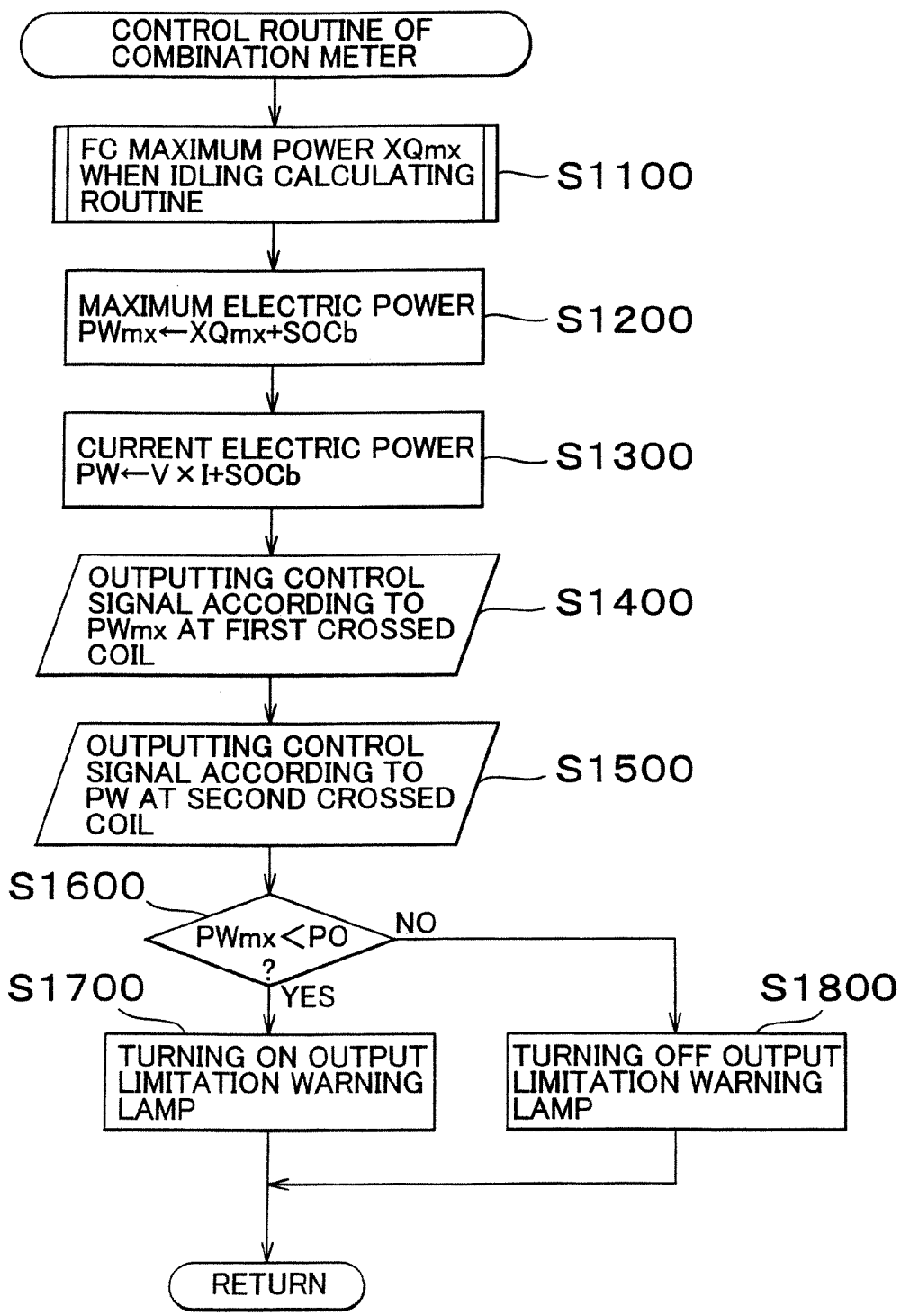
FIG. 18 is a flow chart showing a control routine of a combination meter.

The following explains the software configuration of the second preferred embodiment. The same electric control processes as the ones of the first preferred embodiment are performed according to the second preferred embodiment. The control routine of the output limitation warning lamp of the first preferred embodiment is not carried out in this preferred embodiment. According to the second preferred embodiment, a control routine of the combination meter including the control of turning on and off the output limitation warning lamp 842 is carried out. FIG. 18 is a flow chart showing the control routine of the combination meter. The control routine is repeatedly carried out after every predetermined period by the power control unit 700.

As shown in FIG. 18, the CPU of the power control unit 700 carries out a routine for calculating a FC maximum power XQmx when idling as the first step of this control routine (step S1100). The FC maximum power XQmx when idling is a parameter showing a maximum output of the fuel cell 200 while idling.

Figure 19:
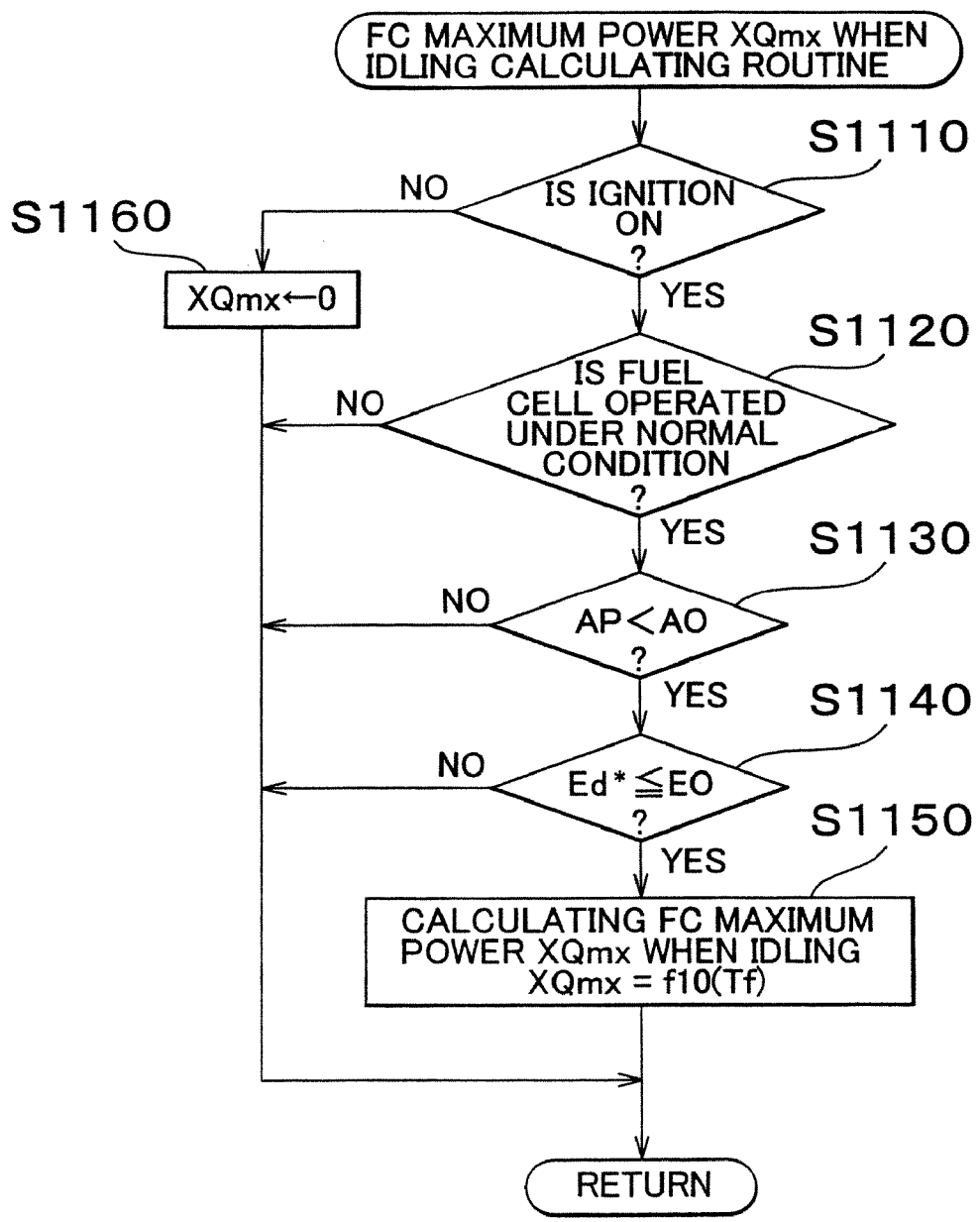
FIG. 19 is a flow chart showing a FC maximum power XQmx calculating routine when idling.

FIG. 19 is a flow chart showing a routine for calculating the FC maximum power XQmx when idling. As shown, the CPU determines whether an engine of a vehicle is idling or not by carrying out four steps from step S1110 through step S1140 as the first process of this routine. At the first step S1110, the CPU determines whether an ignition switch of the vehicle, on which the power output device for mounting on a vehicle is mounted, is on or not. At step S1120, the CPU determines whether the fuel cell 200 is operated under normal conditions or not. This determination is carried out by checking whether parameters showing a state of operating the fuel cell such as a temperature of the fuel cell 200, a pressure of supplied gas of fuel, and a temperature of water coolant are within predetermined ranges.

At step S1130, the CPU determines whether the accelerator position AP, which has been input at step S110 in the routine for setting Ed, Eb and Ef (FIG. 6) called from the electric control routine, is less than a predetermined value A0 (3%, for example). At step S1140, the CPU determines whether the required output Ed*, which has been calculated at step S130 in the routine for setting Ed, Eb and Ef, is less than a predetermined value (5 KW, for example).

If all the determinations at steps S1110 through S1140 are affirmative, the CPU determines that the engine is idling and proceeds to step S1150. Though the CPU determines that the engine is idling when all the determinations at steps S1110 through S1140 are affirmative according to the present preferred embodiment, it is not necessary to meet all the conditions. The point is that the CPU may determine that the engine is idling when a condition under which a heavy load is not applied to the drive motor 830 is met. For example, the determination whether the engine is idling or not may be carried out only through steps S110 and S130. The determination may also be carried out only through step S130.

Figure 20:
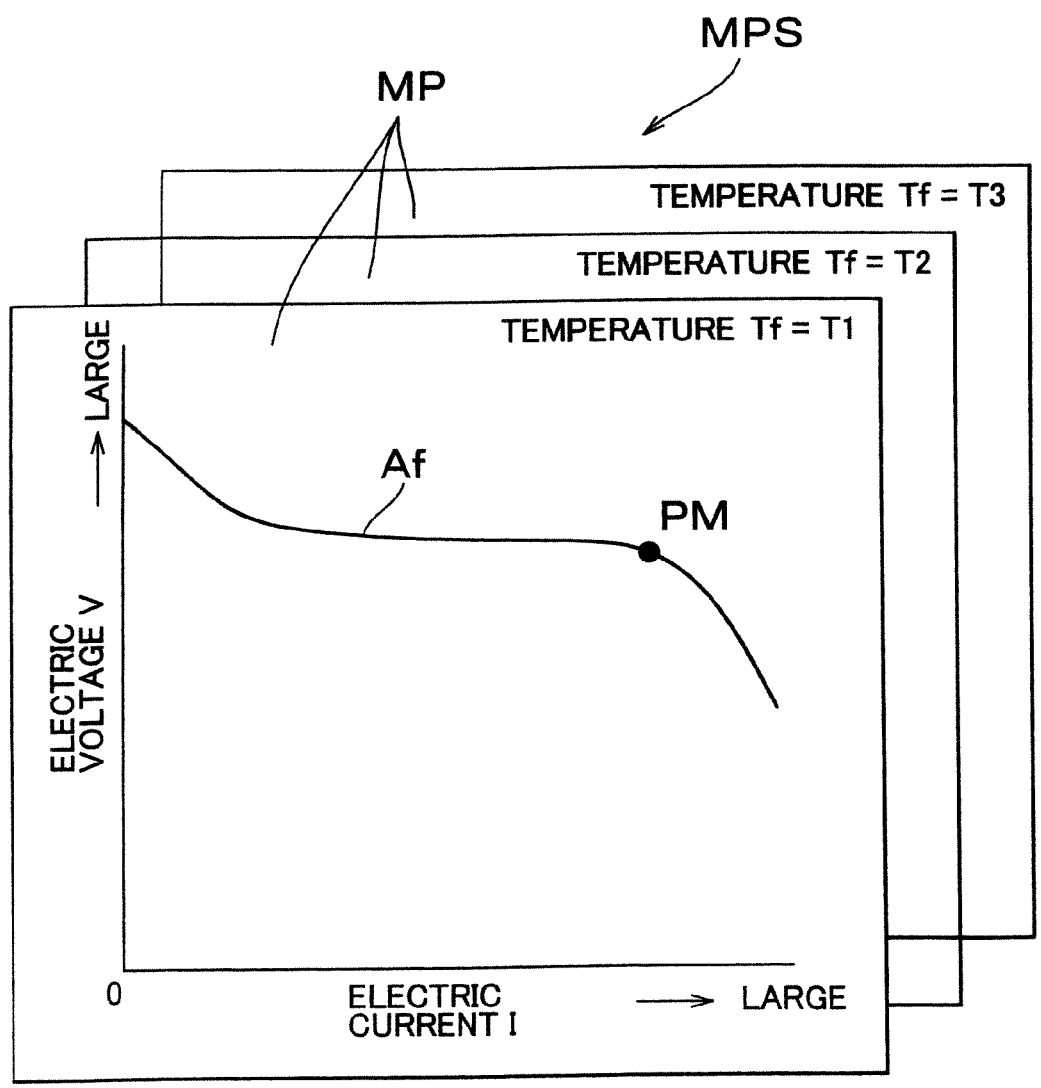
FIG. 20 is an explanatory drawing showing an example of a group of maps specifying a voltage-current characteristic according to a temperature of a fuel cell.

At step S1150, the CPU performs the process of calculating the FC maximum power XQmx when idling. This calculation is carried out according to the temperature Tf of the fuel cell 200 input at step S140 of the routine for setting Ed, Eb and Ef (FIG. 6). According to the present preferred embodiment, a group of maps specifying a voltage-electric current characteristic at every temperature of the fuel cell 200 is stored by the ROM of the power control unit 700. Then the FC maximum power XQmx when idling according to the temperature Tf is derived from the group of the maps. FIG. 20 shows an example of the group of the maps.

As shown in FIG. 20, the group of maps MPS includes plural two-dimensional maps MP showing a voltage-electric current characteristic, and these plural maps are provided at every temperature Tf. At step S1150, the CPU first performs the process of selecting a map MP, which specifies the same temperature as the temperature Tf of the fuel cell 200 input at step S140, from the group of the maps MPS stored in the ROM. An Af curve showing a voltage-electric current characteristic as the performance of the fuel cell 200 is recorded in any one of the maps. The CPU traces the Af curve and determines a point PM where an output electric power, which is the product of the output voltage V and the output electric current I, reaches the maximum. Then the CPU stores the maximum electric power at the point PM as the FC maximum power XQmx when idling in the ROM.

Then the CPU proceeds to "return" and ends the routine for calculating the FC maximum power XQmx when idling for the moment. If the determination at step S1110 is negative, in other words, the CPU determines that the ignition switch is not on, the CPU clears the FC maximum power XQmx when idling previously calculated to zero (step S1160) and proceeds to "return," to end this routine for the moment. On the other hand, if any of the determinations at steps from S1120 through S1140 is negative, the CPU immediately proceeds to "return," to retain the FC maximum power XQmx when idling calculated at step S1150, and ends this routine for the moment.

When the routine for calculating the FC maximum power XQmx when idling is ended, the CPU carries out step S1200 in FIG. 18. At step S1200, the CPU stores the sum of the FC maximum power XQmx when idling calculated in the routine for calculating the FC maximum power XQmx when idling and a current SOC (SOCb hereafter) of the secondary battery 800 detected by the SOC sensor 864 as the possible maximum electric power PWmx from the power output device for mounting on a vehicle. At this time, the SOCb is derived from the value of the SOC input at step S160 in FIG. 6. In other words, the sum of the FC maximum power XQmx when idling, which is the maximum power of the fuel cell 200 when idling, and the current SOCb of the secondary battery 800, is specified as the maximum electric power PWmx of the power output device for mounting on a vehicle.

Then the CPU carries out a calculation based on the following formula (4) and stores a result of the calculation as the currently possible electric power PW (current electric power) at step S1300.

Current electric power $PW = V \times I + SOCb$ (4)

The V in the formula is an output voltage of the fuel cell 200 derived from a result of detection of the voltage sensor 868. The I in the formula is an output electric current of the fuel cell 200 derived from a result of detection of the electric current sensor 870. The SOCb is the SOC of the secondary battery 800 derived from the value of the SOC input at step S160. Then the CPU outputs control signals according to the maximum electric power PWmx calculated at step S1200 at the first crossed coil 1030 to drive the long hand 1022 of the power meter 1020 so that the long hand 1022 swings and shows the maximum electric power PWmx (step S1400). Furthermore, the CPU outputs control signals according to the current electric power PW calculated at step S1300 at the second crossed coil 1034 to drive the short hand 1024 of the power meter 1020 so that the short hand 1024 swings and shows the current electric power PW (step S1500).

After carrying out step S1500, the CPU determines whether the maximum electric power PWmx is less than the predetermined value P0 (step S1600). As previously mentioned, the predetermined value P0 is a value showing the red zone provided at the scale board of the power meter 1020. If the CPU determines that the PWmx is less than P0 at step S1600, the CPU turns on the output limitation warning lamp 842 (step S1700). On the other hand, if the CPU determines that the PWmx is equal to or more than P0, the CPU turns off the output limitation warning lamp 842 (step S1800). After carrying out step S1700 or S1800, the CPU proceeds to "return" to end this control routine for the moment.

G. Effects

Figure 21:
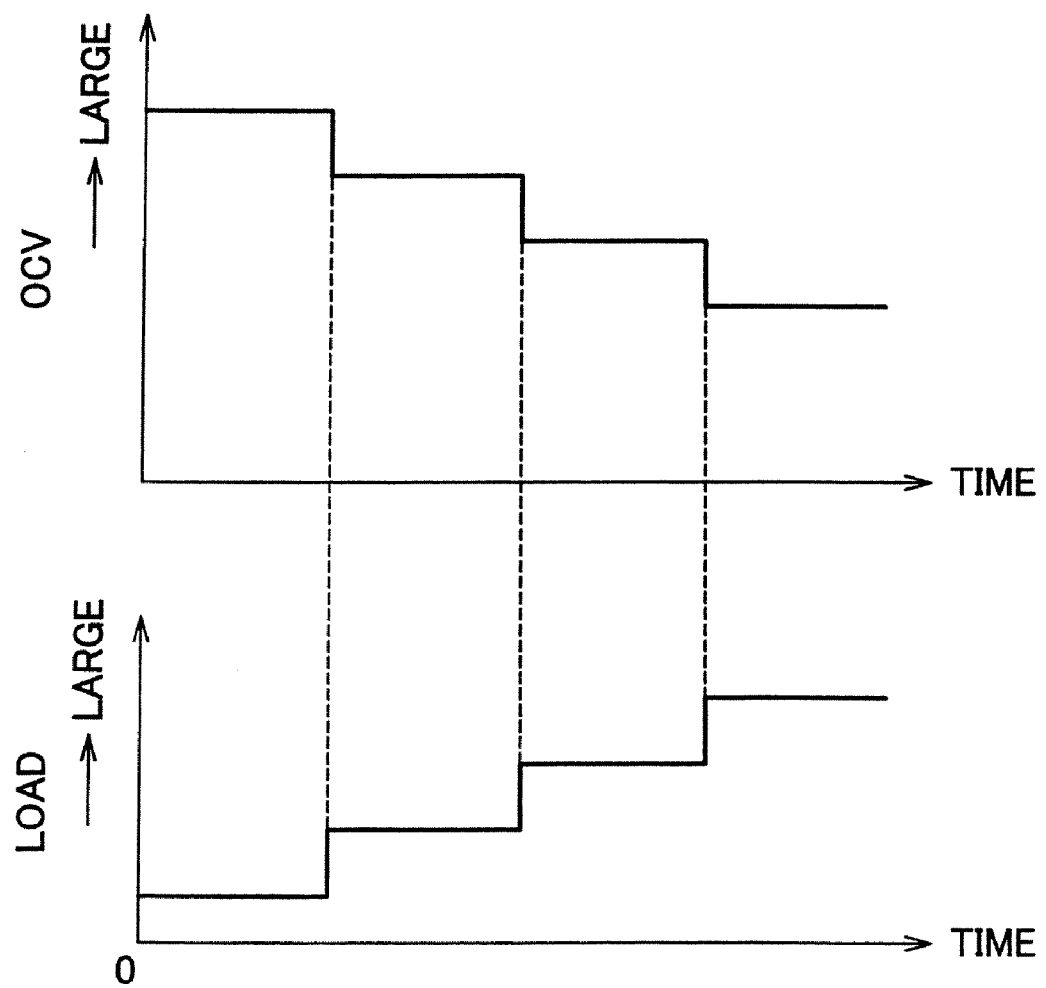
FIG. 21 is an explanatory drawing showing a relation between an OCV and a load at a fuel cell.

According to the second preferred embodiment as comprised above, the FC maximum power XQmx when idling showing the maximum electric power of the fuel cell 200 is calculated when idling. FIG. 21 is an explanatory drawing showing a relation between the OCV and a load at the fuel cell 200. As shown, when the load fluctuates according to a time t, the OCV fluctuates according to the fluctuation of the load. As the load decreases, the OCV increases. When the load reaches the minimum, in other words when idling, the OCV reaches the maximum. Therefore, the FC maximum power XQmx when idling of the fuel cell 200 calculated above becomes a stable maximum value without an influence from the load as a factor of fluctuation.

According to the second preferred embodiment, the calculated FC maximum XQmx is stored even after idling. The sum of the XQmx and the current SOCb of the secondary battery 800 is calculated as the maximum electric power PWmx of the power output device for mounting on a vehicle. When the maximum electric power PWmx is less than the predetermined value P0, the output limitation warning lamp 842 is turned on.

As described above, if a maximum electric power of a fuel cell is derived from a current output of the fuel cell which is being operated, a state of power shortage is frequently detected because of rapid fluctuations of the load, and then the power shortage is frequently notified. On the contrary, the maximum electric power of the fuel cell is a stable value, and turning on and off of the output limitation warning lamp 842 is controlled according to the maximum electric power PWmx calculated from the maximum electric power of the fuel cell as described above according to the second preferred embodiment. As a result, the output limitation warning lamp 842 will be turned on only if an output of the fuel cell 200 is lowered by a failure. Therefore, an operator can accurately be notified of the failure of the fuel cell 200 without an influence of the load fluctuation. Furthermore, the notification of the failure is carried out by the output limitation warning lamp 842 so that the driver can immediately be notified of the failure through the combination meter 1010 in the instrument panel.

In addition, the maximum electric power PWmx is indicated by the power meter 1020 provided in the combination meter 1010 according to the configuration of the second preferred embodiment. Therefore, stable indication of the maximum electric power is possible without influence from the load fluctuation. Especially, the red zone 1028 showing that the maximum electric power PWmx is less than the predetermined value is provided on the scale board 1026 of the combination meter 1010. Therefore, the operator can also be notified of the failure of the fuel cell 200 through the red zone 1028.

Furthermore, the short hand 1024, in addition to the long hand 1022 indicating the maximum electric power PWmx, is provided at the power meter 1020 according to the second preferred embodiment. The short hand 1024 indicates the current electric power PW output from the power output device for mounting on a vehicle. Therefore, a comparison between the maximum electric power PWmx and the current electric power PW of the power output device can be done easily.

According to the power output device for mounting on a vehicle of the second preferred embodiment, the secondary battery 800 is provided as an energy source other than the fuel cell 200. According to a conventional power output device for mounting on a vehicle with two energy sources: a fuel cell and a secondary battery, an output rapidly drops when the charge of the secondary battery begins to be insufficient because of the fluctuation of the OCV of the fuel cell according to the load fluctuation as described above. On the contrary, an operator can accurately be notified of a failure of the fuel cell without the influence of the load fluctuation, as described above, even with the configuration including the fuel cell and the secondary battery according to the second preferred embodiment.

Though the configuration in which the output limitation warning lamp 842 is turned on is adopted as a notification means to notify a driver of a power shortage according to the second preferred embodiment, a configuration, in which a warning buzzer is rung may instead be adopted. In addition, the driver may be notified of the power shortage through a sense of touch by vibration.

Though the configuration in which the output limitation warning lamp 842 is provided is adopted according to the second preferred embodiment, the output limitation warning lamp 842 may be omitted since the driver can be notified of the power shortage through the long hand 1022, which has lowered into the red zone of the power meter 1020. On the contrary, a configuration in which the power meter 1020 is omitted and the output limitation warning lamp 842 is provided may be adopted.

Though the configuration in which the long hand 1022 and the short hand 1024 are provided at the power meter 1020 to indicate the maximum electric power PWmx of the power output device for mounting on a vehicle and the current electric power PW respectively for comparison is adopted, a configuration in which the short hand is omitted to only indicate the maximum electric power PWmx may be adopted. The operator can be notified of the failure of the fuel cell through values pointed by the long hand 1022. Furthermore, a configuration in which indication of the red zone 1028 is omitted may be adopted.

Though the power meter 1020 is an analog meter according to the second preferred embodiment, a digital meter may be adopted. For example, a configuration in which the maximum electric power PWmx is indicated by the area of a zone on a display, and the indication color is changed into red from green when the maximum electric power PWmx is less than the predetermined P0, may be adopted.

Though the power output device for mounting on a vehicle of the second preferred embodiment includes the fuel cell 200 and the secondary battery 800 as energy sources, a configuration in which only the fuel cell 200 is provided may be adopted. With this configuration, a possible maximum electric power from the power output device for mounting on a vehicle can be indicated on the power meter as a value calculated in the above-described routine for calculating the FC maximum power XQmx when idling, and the output limitation lamp can be turned on and off according to the value. Furthermore, the present invention can be applied to a configuration including another energy source other than the fuel cell 200 and the secondary battery 800. The point is that the present invention can be applied to any configuration with a fuel cell outputting power as one of energy sources.

The maximum electric power PWmx and the current electric power PW according to the second preferred embodiment correspond to the maximum output and the output of the present invention respectively. Other parameters such as the amount of hydrogen supply and the amount of oxidizing gas may be used to calculate the maximum output and the output as another aspect of the present invention.

Though the above-described first and second embodiments explains the power output devices when they are mounted on the vehicle, they may be mounted on other means of transportation such as boats, ships and aircraft or other various industrial machines.

Though the preferred embodiments of the present invention have been explained above, the present invention, of course, is not limited to these preferred embodiment, and various other aspects within the spirit and scope of the present invention can be embodied.

What is claimed is:

1. A power output device comprising: a fuel cell; a fuel cell characteristic detecting device which detects a characteristic of the fuel cell: a calculation device that calculates a parameter corresponding to a possible electric power of the fuel cell derived from data stored in a memory based on the characteristic detected by the cell characteristic detecting device;
    a determining device that compares the calculated parameter with a predetermined value and for determining whether the possible electric power constitutes a power shortage; and
    a notification device that provides a notification of the power shortage to a user or driver when the determining device has determined that a power shortage exists.

2. The power output device according to claim 1, wherein the calculation device includes a device that calculates the possible electric power value as a maximum output under a rated voltage according to the detected cell characteristic.

3. The power output device according to claim 1, wherein:
    the fuel cell characteristic detecting device includes a fuel cell state detecting device that detects a state of the fuel cell; and
    the calculation device includes a device that calculates the possible electric power as an amount of limiting output for limiting an output of the fuel cell.

4. The power output device according to claim 3, wherein the characteristic of the fuel cell detected through the fuel cell state detecting device at least includes a temperature of the fuel cell.

5. The power output device according to claim 1, wherein:
    the fuel cell characteristic detecting device includes a fuel pump state detecting device that detects a state of a fuel pump for supplying fuel gas to the fuel cell; and the calculation device includes a device that calculates the possible electric power as an amount of limiting fuel gas for limiting the amount of the fuel gas supplied from the fuel pump.

6. The power output device according to claim 5, wherein the state of the fuel pump detected through the fuel pump state detecting device is a temperature of a motor for the fuel pump.

7. The power output device according to claim 1, wherein: the fuel cell characteristic detecting device includes a compressor state detecting device that detects a state of a compressor for supplying pressurized oxidizing gas to the fuel cell; and
the calculation device includes a device that calculates the possible electric power value as an amount of limiting oxidizing gas for limiting the amount of the oxidizing gas supplied from the compressor.

8. The power output device according to claim 7, wherein the state of the compressor detected through the compressor state detecting device is a temperature of a motor for the compressor.

9. The power output device according to claim 1, wherein the notification device includes a notification lamp for visually carrying out the notification.

10. The power output device according to claim 1, wherein the notification device provides the notification of the power shortage when the state of power shortage is determined by the determining device while the fuel cell outputs electric power.

11. The power output device according to claim 9, wherein the notification device switches the notification lamp from turning off to lighting to provide the notification of power shortage.

12. A vehicle comprising: the power output device according to claim 1; and a motor that generates thrust of the vehicle by electric power from the fuel cell, wherein the notification device provides the notification of power shortage when the state of power shortage is determined by the determining device while the vehicle is running by the motor.

13. A power output device comprising:
a fuel cell; a cell characteristic detecting device that detects a temperature of the fuel cell;
a calculation device which calculates a possible electric power of the fuel cell based on the detected temperature;
a determining device that determines whether the possible electric power from the fuel cell constitutes a power shortage on the basis of the calculated possible electric power calculated by the calculation device; and
a notification device that provides a notification of the power shortage to a user or driver when the existence of a power shortage has been determined by the determining device.

14. The power output device according to claim 1, further including: an idle determining device which determines whether an idling condition is present; wherein the calculation device calculates the possible electric power in response to a determination that the idling condition is present, such that the possible electric power is calculated during idling; and
wherein the notification device provides the notification when a state of power shortage is determined based on the calculation of the possible electric power during the idling condition.

15. The power output device according to claim 14, wherein the calculation device includes a plurality of maps for respective different values of the detected characteristic at the idling condition.

16. The power output device according to claim 14, wherein the detected characteristic is a fuel cell temperature and wherein the calculation device includes a plurality of maps for indicating possible electric power values for different temperatures detected during idling.

17. The power output device according to claim 1, wherein the characteristic detected by the fuel cell characteristic detecting device is a fuel cell temperature, and the calculation device calculates the possible electric power based on the detected temperature.

18. The power output device according to claim 17, wherein the detected fuel cell temperature is an idling temperature.

19. The power output device according to claim 18, wherein the calculation device includes a plurality of maps corresponding to different idling temperatures, and wherein the plurality of maps indicate a possible power for a plurality of idling temperatures.

20. A power output device according to claim 19, wherein each map includes a voltage-current characteristic of the fuel cell for a corresponding idling temperature.

21. The power output device according to claim 13, wherein the calculation device calculates the possible electric power from a plurality of voltage-current relationships corresponding to a plurality of different fuel cell temperatures.

22. The power output device according to claim 21, wherein the plurality of relationships are provided in the form of a plurality of maps with each map corresponding to a different temperature.

23. The power output device according to claim 13, further including:
an idle determining device which determines whether an idling condition is present;
wherein the detecting device and the calculation device respectively detect the temperature and calculate the possible electric power in response to a determination that the idling condition is present.

* * * * *